US012627396B2

(12) United States Patent
Mu

(10) Patent No.: US 12,627,396 B2
(45) Date of Patent: May 12, 2026

(54) METHOD FOR SENDING DOWNLINK INFORMATION, METHOD FOR RECEIVING DOWNLINK INFORMATION, AND DEVICE

(71) Applicant: Beijing Xiaomi Mobile Software Co., Ltd., Beijing (CN)

(72) Inventor: Qin Mu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 292 days.

(21) Appl. No.: 18/553,075

(22) PCT Filed: Apr. 1, 2021

(86) PCT No.: PCT/CN2021/085043
§ 371 (c)(1),
(2) Date: Sep. 28, 2023

(87) PCT Pub. No.: WO2022/205348
PCT Pub. Date: Oct. 6, 2022

(65) Prior Publication Data
US 2024/0195522 A1     Jun. 13, 2024

(51) Int. Cl.
*H04L 1/00*          (2006.01)
*H04W 74/08*        (2024.01)
*H04W 74/0833*     (2024.01)

(52) U.S. Cl.
CPC .......... *H04L 1/0007* (2013.01); *H04L 1/0025* (2013.01); *H04W 74/0833* (2013.01); *H04W 74/0866* (2013.01)

(58) Field of Classification Search
CPC ... H04L 1/0007; H04L 1/0025; H04L 1/0009; H04W 74/0833; H04W 74/0866;
(Continued)

(56) References Cited

U.S. PATENT DOCUMENTS 10,904,912 B2 * 1/2021 Golitschek Edler von Elbwart ...
                                                            H04L 5/0053
11,831,436 B2 * 11/2023 Jeon ................... H04W 72/1268
(Continued)

FOREIGN PATENT DOCUMENTS

CN          110720190 A       1/2020
CN          111108708 A       5/2020
(Continued)

OTHER PUBLICATIONS

International Search Report Mailed on Jan. 4, 2022 in PCT/CN2021/085043 filed on Apr. 1, 2021 (4 pages).
(Continued)

*Primary Examiner* — Ivan O Latorre
(74) *Attorney, Agent, or Firm* — Oblon, McClelland, Maier & Neustadt, L.L.P.

(57)                    ABSTRACT
A method for sending downlink information, including: determining, by a network device, a transport block size scaling (TBS Scaling) processing mode corresponding to first downlink information, the TBS Scaling processing mode comprising a first processing mode or a second processing mode, the first processing mode being a processing mode to perform TBS Scaling, and the second processing mode being a processing mode not to perform TBS Scaling; and, sending, by the network device, the first downlink information in the TBS Scaling processing mode.

6 Claims, 10 Drawing Sheets

Receiving a broadcast channel, the broadcast channel including first indication information, the first indication information including at least one mapping relationship, and the mapping relationship including a user equipment type and a corresponding TBS Scaling processing mode                                            1001

Determining the transport block size scaling (TBS Scaling) processing mode corresponding to the first downlink information according to the device type of the user equipment and the first indication information                                        1002

Receiving the first downlink information in the TBS Scaling processing mode                                        1003

(58) Field of Classification Search
CPC ......... H04W 72/0446; H04W 72/0453; H04W 72/542; H04W 72/23
See application file for complete search history.

(56) References Cited

U.S. PATENT DOCUMENTS

| | | | |
|---|---|---|---|
| 2013/0195031 A1* | 8/2013 | Hessler | H04L 1/1819 370/329 |
| 2019/0230699 A1 | 7/2019 | Davydov et al. | |
| 2019/0306876 A1* | 10/2019 | Golitschek Edler von Elbwart | H04L 5/0055 |
| 2019/0313426 A1* | 10/2019 | Lin | H04W 72/12 |
| 2019/0349116 A1* | 11/2019 | Hosseini | H04L 1/0011 |
| 2019/0349978 A1* | 11/2019 | Lin | H04L 1/0023 |
| 2021/0076383 A1* | 3/2021 | Wong | H04W 76/28 |
| 2021/0211930 A1* | 7/2021 | Larsson | H04L 5/0044 |
| 2021/0314814 A1* | 10/2021 | Yu | H04L 1/1825 |
| 2022/0132464 A1* | 4/2022 | Agiwal | H04W 68/02 |
| 2022/0210806 A1* | 6/2022 | Rastegardoost | H04L 5/0094 |
| 2024/0031056 A1* | 1/2024 | Rastegardoost | H04W 74/0833 |
| 2024/0179720 A1* | 5/2024 | Mu | H04L 1/0025 |
| 2024/0195522 A1* | 6/2024 | Mu | H04W 74/0866 |
| 2025/0119249 A1* | 4/2025 | Zhao | H04L 5/0044 |
| 2025/0159682 A1* | 5/2025 | Liu | H04L 1/1845 |

FOREIGN PATENT DOCUMENTS

| | | |
|---|---|---|
| CN | 111602355 A | 8/2020 |
| CN | 112106321 A | 12/2020 |
| CN | 112262538 A | 1/2021 |
| CN | 112468275 A | 3/2021 |
| WO | WO 2013/115690 A1 | 8/2013 |

OTHER PUBLICATIONS

Qualcomm Inc. "Coverage Recovery for RedCap Devices", 3GPP TSG-RAN WG1 Meeting #103-e, RI-2009310, Nov. 13, 2020 (Nov. 13, 2020), 18 pages.

Combined Chinese Office Action and Search Report issued Dec. 26, 2023 in Chinese Patent Application No. 202180000942.8 (with English Translation of Office Action only), 12 pages.

Combined Chinese Office Action and Search Report issued Jun. 7, 2024 in Chinese Patent Application No. 202180000942.8 (with English Translation of Office Action only), 16 pages.

Ericsson, "Coverage enhancement for channels other than PUSCH and PUCCH", 3GPP TSG-RAN WG1 Meeting #103-e e-Meeting, R1-2008421, Oct. 26, 2020-Nov. 13, 2020, 9 pages.

* cited by examiner

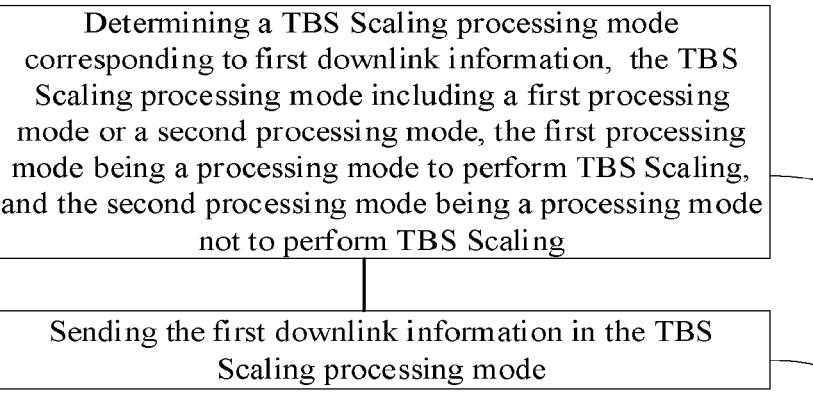

Determining a TBS Scaling processing mode corresponding to first downlink information, the TBS Scaling processing mode including a first processing mode or a second processing mode, the first processing mode being a processing mode to perform TBS Scaling, and the second processing mode being a processing mode not to perform TBS Scaling      101

Sending the first downlink information in the TBS Scaling processing mode      102

FIG. 1

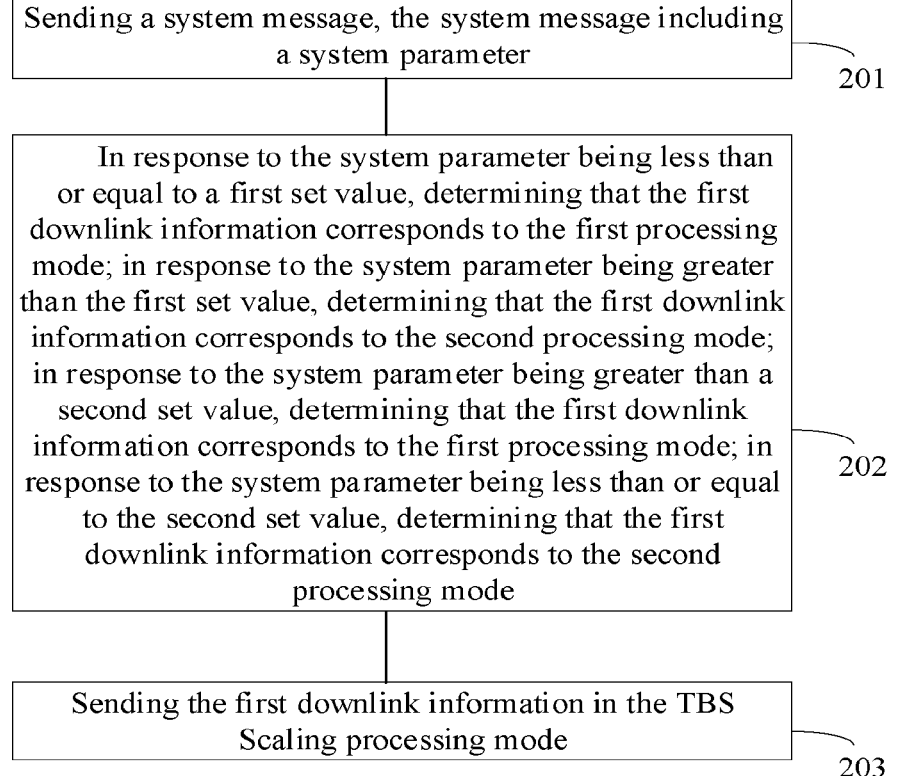

Sending a system message, the system message including a system parameter      201

In response to the system parameter being less than or equal to a first set value, determining that the first downlink information corresponds to the first processing mode; in response to the system parameter being greater than the first set value, determining that the first downlink information corresponds to the second processing mode; in response to the system parameter being greater than a second set value, determining that the first downlink information corresponds to the first processing mode; in response to the system parameter being less than or equal to the second set value, determining that the first downlink information corresponds to the second processing mode      202

Sending the first downlink information in the TBS Scaling processing mode      203

FIG. 2

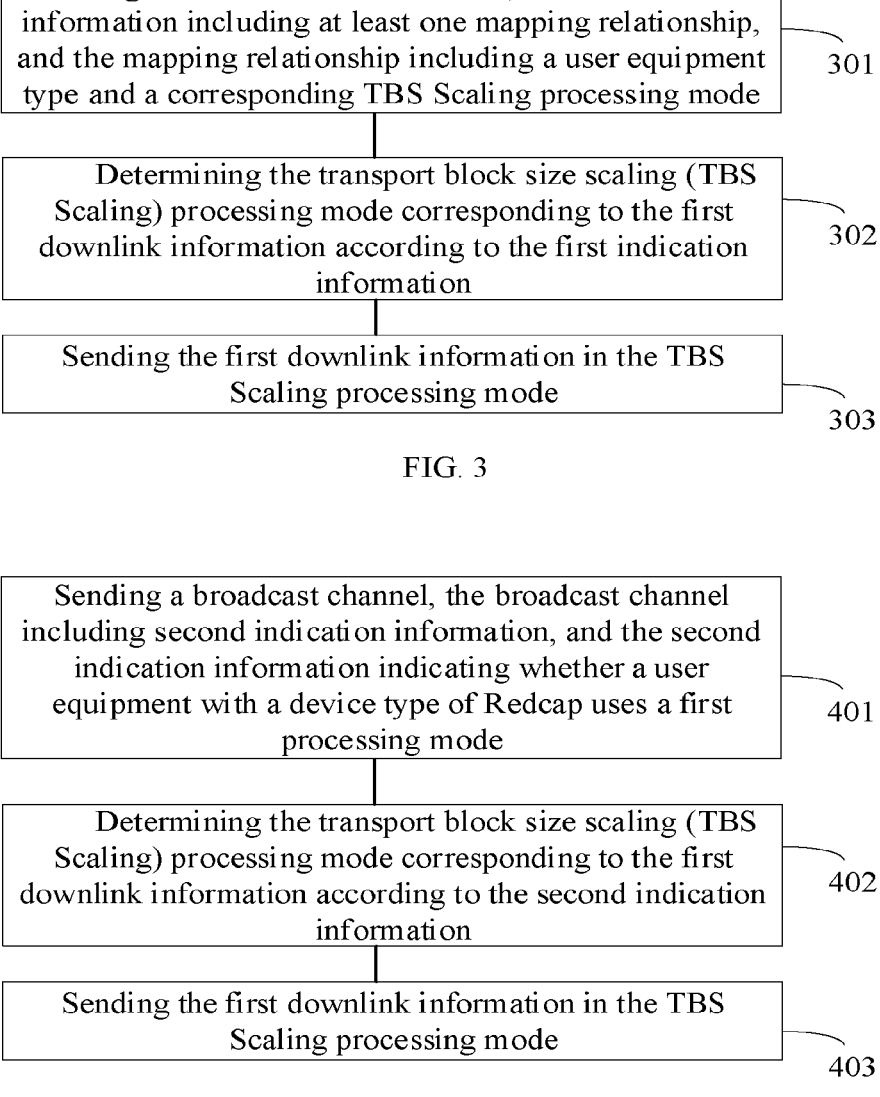

Sending a broadcast channel, the broadcast channel including first indication information, the first indication information including at least one mapping relationship, and the mapping relationship including a user equipment type and a corresponding TBS Scaling processing mode — 301

Determining the transport block size scaling (TBS Scaling) processing mode corresponding to the first downlink information according to the first indication information — 302

Sending the first downlink information in the TBS Scaling processing mode — 303

FIG. 3

Sending a broadcast channel, the broadcast channel including second indication information, and the second indication information indicating whether a user equipment with a device type of Redcap uses a first processing mode — 401

Determining the transport block size scaling (TBS Scaling) processing mode corresponding to the first downlink information according to the second indication information — 402

Sending the first downlink information in the TBS Scaling processing mode — 403

FIG. 4

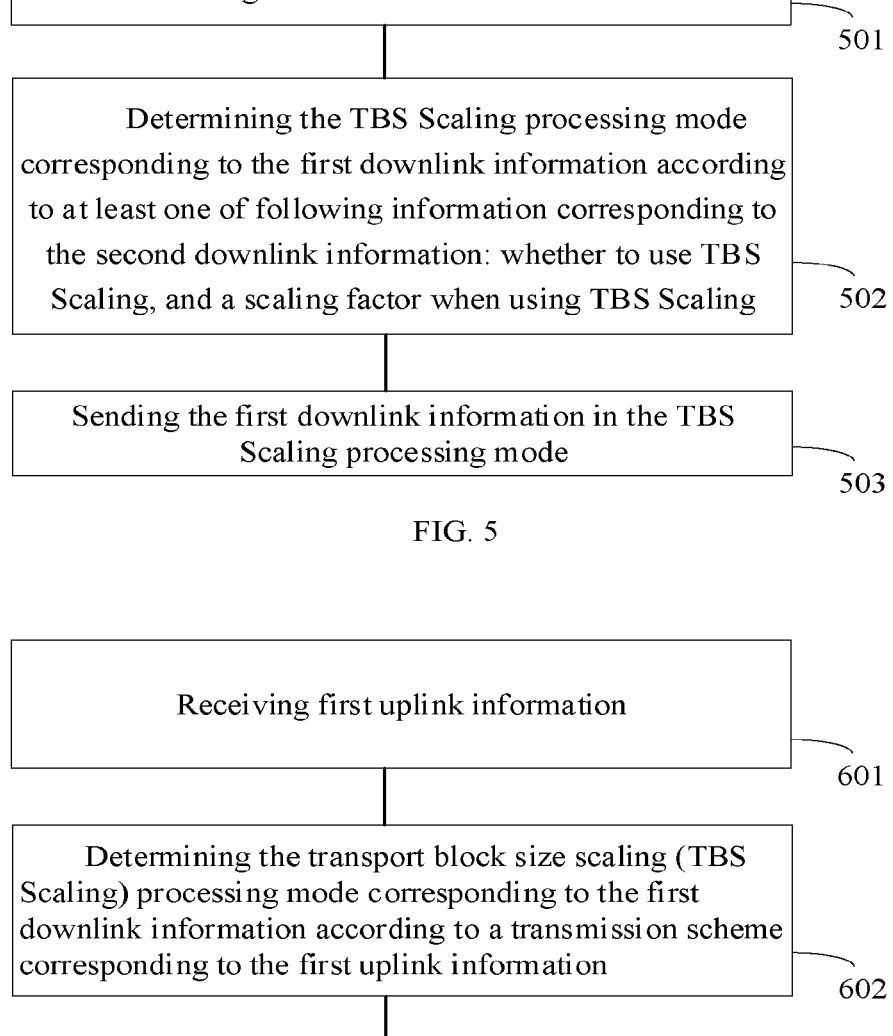

Sending second downlink information

501

Determining the TBS Scaling processing mode corresponding to the first downlink information according to at least one of following information corresponding to the second downlink information: whether to use TBS Scaling, and a scaling factor when using TBS Scaling

502

Sending the first downlink information in the TBS Scaling processing mode

Receiving first uplink information

601

Determining the transport block size scaling (TBS Scaling) processing mode corresponding to the first downlink information according to a transmission scheme corresponding to the first uplink information

602

Sending the first downlink information in the TBS Scaling processing mode

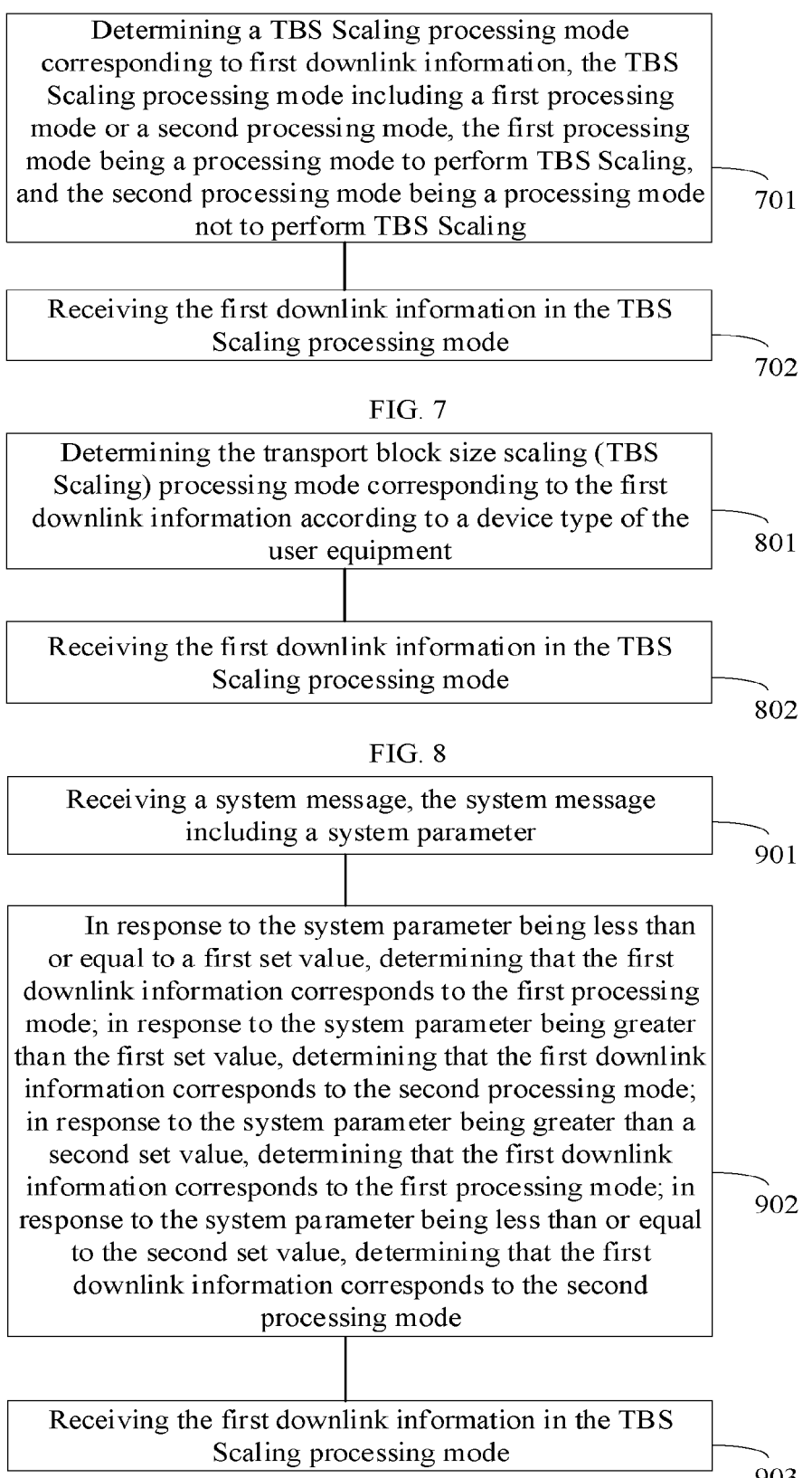

Determining a TBS Scaling processing mode corresponding to first downlink information, the TBS Scaling processing mode including a first processing mode or a second processing mode, the first processing mode being a processing mode to perform TBS Scaling, and the second processing mode being a processing mode not to perform TBS Scaling ~~~ 701

Receiving the first downlink information in the TBS Scaling processing mode ~~~ 702

FIG. 7

Determining the transport block size scaling (TBS Scaling) processing mode corresponding to the first downlink information according to a device type of the user equipment ~~~ 801

Receiving the first downlink information in the TBS Scaling processing mode ~~~ 802

FIG. 8

Receiving a system message, the system message including a system parameter ~~~ 901

In response to the system parameter being less than or equal to a first set value, determining that the first downlink information corresponds to the first processing mode; in response to the system parameter being greater than the first set value, determining that the first downlink information corresponds to the second processing mode; in response to the system parameter being greater than a second set value, determining that the first downlink information corresponds to the first processing mode; in response to the system parameter being less than or equal to the second set value, determining that the first downlink information corresponds to the second processing mode ~~~ 902

Receiving the first downlink information in the TBS Scaling processing mode ~~~ 903

FIG. 9

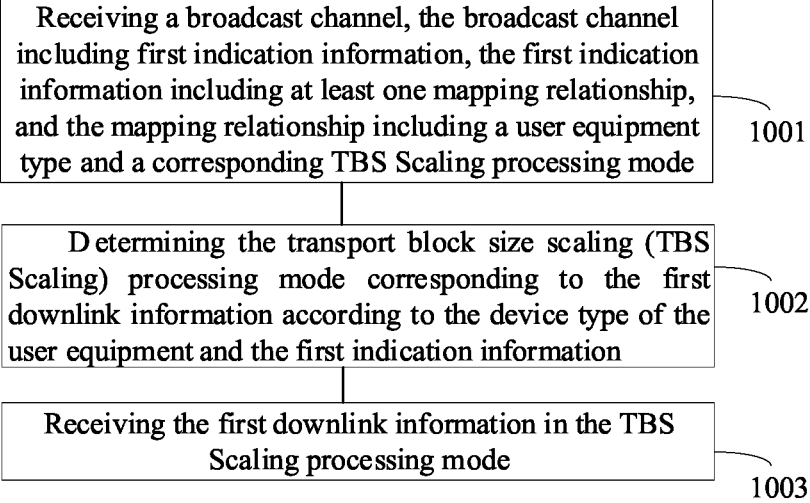

Receiving a broadcast channel, the broadcast channel including first indication information, the first indication information including at least one mapping relationship, and the mapping relationship including a user equipment type and a corresponding TBS Scaling processing mode

1001

Determining the transport block size scaling (TBS Scaling) processing mode corresponding to the first downlink information according to the device type of the user equipment and the first indication information

1002

Receiving the first downlink information in the TBS Scaling processing mode

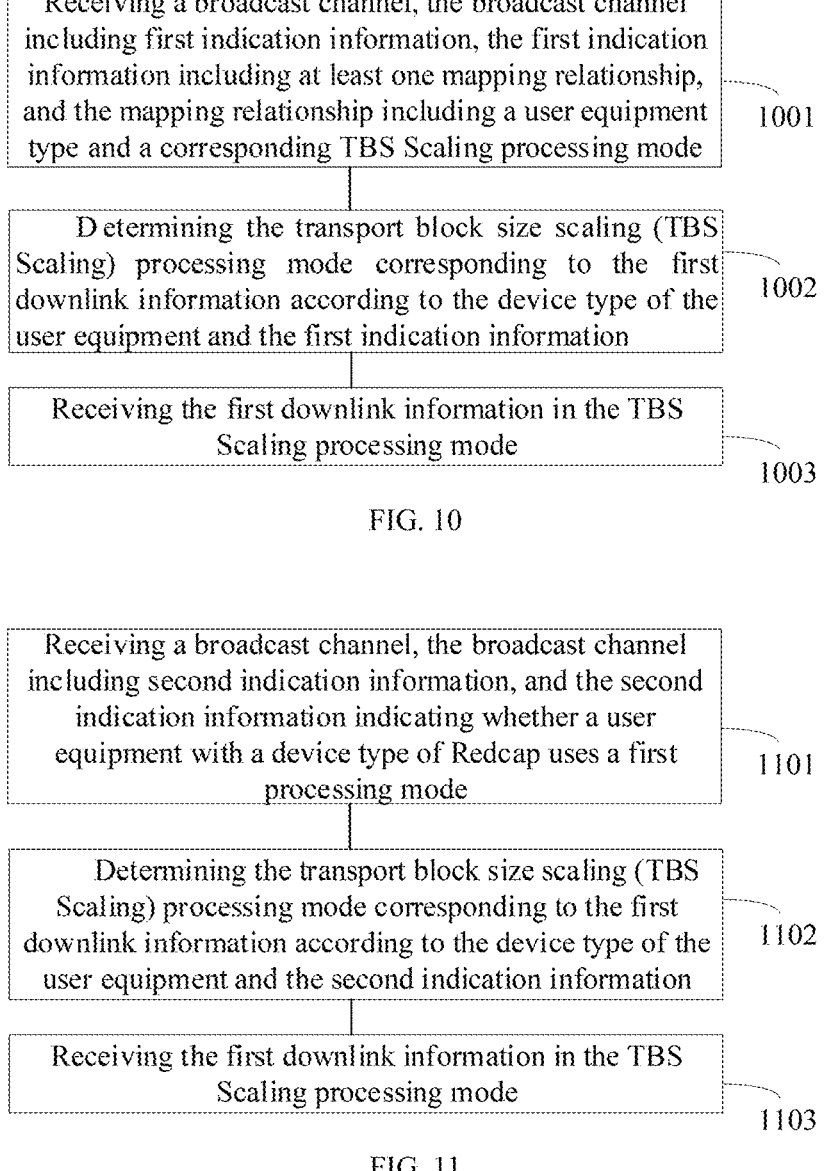

Receiving a broadcast channel, the broadcast channel including first indication information, the first indication information including at least one mapping relationship, and the mapping relationship including a user equipment type and a corresponding TBS Scaling processing mode

1001

Determining the transport block size scaling (TBS Scaling) processing mode corresponding to the first downlink information according to the device type of the user equipment and the first indication information

1002

Receiving the first downlink information in the TBS Scaling processing mode

Receiving a broadcast channel, the broadcast channel including second indication information, and the second indication information indicating whether a user equipment with a device type of Redcap uses a first processing mode

1101

Determining the transport block size scaling (TBS Scaling) processing mode corresponding to the first downlink information according to the device type of the user equipment and the second indication information

1102

Receiving the first downlink information in the TBS Scaling processing mode

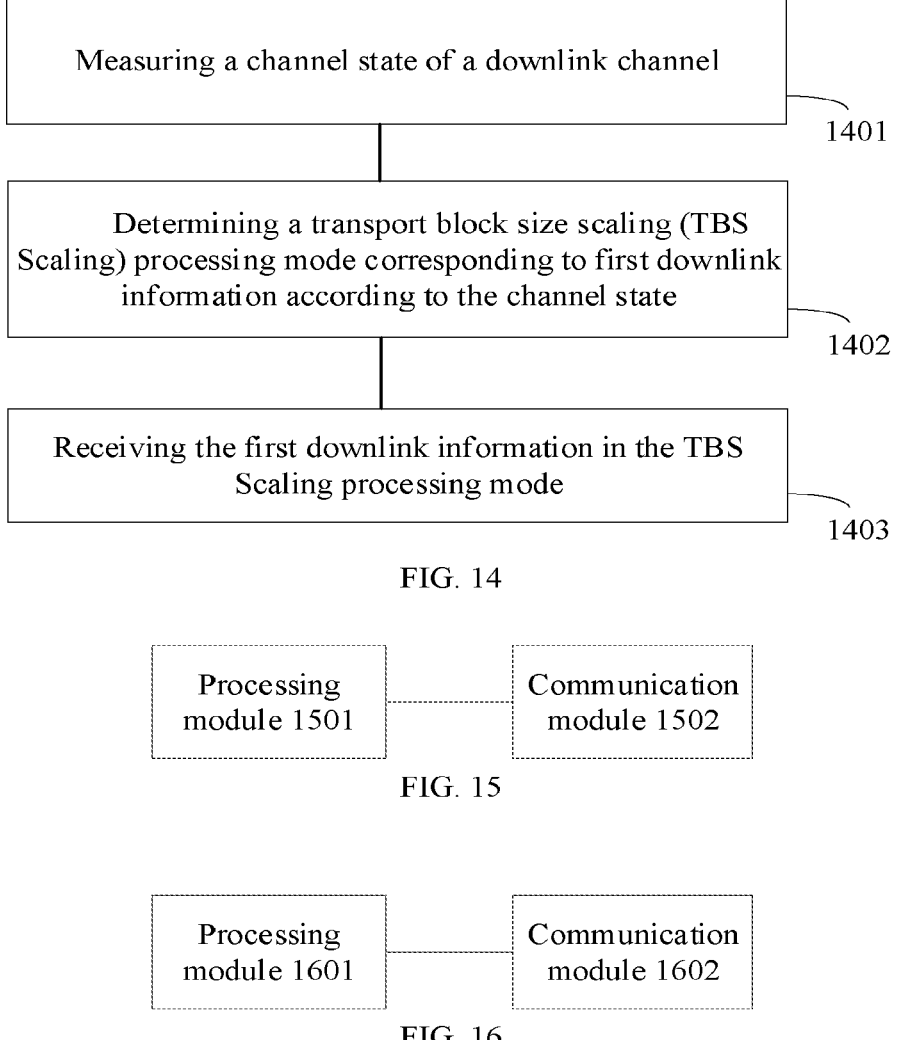

Measuring a channel state of a downlink channel

1401

Determining a transport block size scaling (TBS Scaling) processing mode corresponding to first downlink information according to the channel state

1402

Receiving the first downlink information in the TBS Scaling processing mode

Processing module 1501

Communication module 1502

FIG. 15

Processing module 1601

Communication module 1602

METHOD FOR SENDING DOWNLINK INFORMATION, METHOD FOR RECEIVING DOWNLINK INFORMATION, AND DEVICE

CROSS REFERENCE TO RELATED APPLICATION

The present application is a U.S. National Stage of International Application No. PCT/CN2021/085043, filed on Apr. 1, 2021, the contents of which are incorporated herein by reference in their entireties for all purposes.

BACKGROUND

Technical Field

The present disclosure relates to the field of wireless communication technology, and in particular, to a method and apparatus for sending downlink information, a method and apparatus for receiving downlink information, a device, and a storage medium.

Description of the Related Art

In a long term evolution (LTE) 4G system, in order to support Internet of thing services, two technologies of a machine type communication (MTC) and a narrow band Internet of thing are proposed. The two technologies are mainly directed to low-rate and high-latency scenarios, such as scenarios of meter reading and environmental monitoring, or the like. For example, NB-IOT can support a maximum rate of several hundreds of K at present, and MTC can support a rate of several M at present. However, with the continuous development of the Internet of thing services, services such as video monitoring, smart home, wearable device, and industrial sensing monitoring are gradually popularized. These services generally require a rate of tens of M to 100 M, while also having relatively high requirements for latency. Therefore, it is difficult for MTC and NB-IOT technology in LTE to satisfy these requirements. Based on this situation, many companies propose redesigning a new user equipment in 5G new radio to cover the requirements of such a terminal Internet of thing device. In the current 3rd generation partnership project (3GPP) standardization, such a new terminal type is called as a Redcap (Reduced capability) user equipment (UE), or referred to as a user equipment based on new radio-lite (NR-Lite).

Similar to the Internet of things device in LTE, such user equipment based on 5G NR-Lite generally needs to satisfy the following requirements: low cost, low complexity, coverage enhancement to a certain degree, power saving, etc.

SUMMARY

According to a first aspect of the embodiments of the present disclosure, there is provided a method for sending downlink information, performed by a network device, including determining a transport block size scaling (TBS Scaling) processing mode corresponding to first downlink information, the TBS Scaling processing mode including a first processing mode or a second processing mode, the first processing mode being a processing mode to perform TBS Scaling, and the second processing mode being a processing mode not to perform TBS Scaling, and sending the first downlink information in the TBS Scaling processing mode.

According to a second aspect of the embodiments of the present disclosure, there is provided a method for receiving downlink information, performed by a user equipment, and including determining a transport block size scaling (TBS Scaling) processing mode corresponding to first downlink information, the TBS Scaling processing mode including a first processing mode or a second processing mode, the first processing mode being a processing mode to perform TBS Scaling, and the second processing mode being a processing mode not to perform TBS Scaling;

receiving the first downlink information in the TBS Scaling processing mode.

According to a third aspect of the embodiments of the present disclosure, there is provided a network side device, including a processor and a memory that is configured to store an executable instruction by the processor. The processor is configured to execute the executable instruction in the memory to implement steps of the above method for sending downlink information.

According to a fourth aspect of the embodiments of the present disclosure, there is provided a mobile terminal, including a processor and a memory that is configured to store an executable instruction by the processor. The processor is configured to execute the executable instruction in the memory to implement steps of the above method for receiving downlink information.

It should be understood that the above general description and the following detailed description are exemplary and explanatory, and cannot limit the present disclosure.

BRIEF DESCRIPTION OF THE DRAWINGS

The accompanying drawings described here, which are used to provide a further understanding of the embodiments of the present disclosure, constitute a part of the present application. The illustrative embodiments of the embodiments of the present disclosure and the description of them are used to explain the embodiments of the present disclosure, and do not constitute an improper limitation on the embodiments of the present disclosure. In the accompanying drawings:

FIG. 1 is a flowchart of a method for sending downlink information according to some embodiments;

FIG. 2 is a flowchart of a method for sending downlink information according to some embodiments;

FIG. 3 is a flowchart of a method for sending downlink information according to some embodiments;

FIG. 4 is a flowchart of a method for sending downlink information according to some embodiments;

FIG. 5 is a flowchart of a method for sending downlink information according to some embodiments;

FIG. 6 is a flowchart of a method for sending downlink information according to some embodiments;

FIG. 7 is a flowchart of a method for receiving downlink information according to some embodiments;

FIG. 8 is a flowchart of a method for receiving downlink information according to some embodiments;

FIG. 9 is a flowchart of a method for receiving downlink information according to some embodiments;

FIG. 10 is a flowchart of a method for receiving downlink information according to some embodiments;

FIG. 11 is a flowchart of a method for receiving downlink information according to some embodiments;

FIG. 14 is a flowchart of a method for receiving downlink information according to some embodiments;

FIG. 15 is a block diagram of an apparatus for sending downlink information according to some embodiments;

FIG. 16 is a block diagram of an apparatus for receiving downlink information according to some embodiments;

DETAILED DESCRIPTION OF THE PREFERRED EMBODIMENTS

Figure 12:
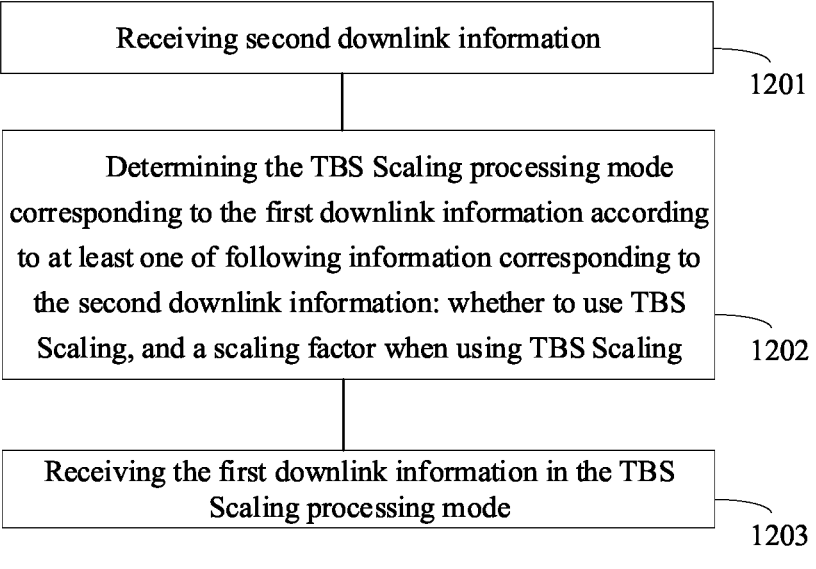
FIG. 12 is a flowchart of a method for receiving downlink information according to some embodiments.

The embodiments of the present disclosure are further described with reference to the accompanying drawings and specific embodiments.

Example embodiments will be described in detail here, examples of which are illustrated in the accompanying drawings. When the following description involves the accompanying drawings, unless otherwise indicated, the same numbers in different drawings represent the same or similar elements. The implementations described in the following example embodiments do not represent all implementations consistent with the embodiments of the present disclosure. On the contrary, they are examples of apparatuses and methods consistent with some aspects of the present disclosure as detailed in the appended claims.

It should be noted that, in an embodiment of the present disclosure, a plurality of steps may be included; for ease of description, these steps are numbered; however, these numbers are not limited to the execution time slot and the execution sequence between the steps; these steps may be implemented in any sequence, and the embodiments of the present disclosure do not limit to this.

For a Redcap user equipment, that is, for a Redcap terminal, coverage loss will be brought due to capability reduction of the terminal. For example, when the receiving antenna of the Redcap terminal is reduced from 4 to 1, the downlink coverage will be affected, and therefore coverage enhancement needs to be performed. When coverage enhancement is performed, the Redcap terminal needs to perform transport block size scaling (TBS Scaling).

However, not all Redcap terminals need to perform coverage enhancement. Therefore, the network device needs to notify the Redcap terminal whether to perform the TBS Scaling processing mode.

According to embodiments of the present disclosure, there is provided a method for sending downlink information. The method is performed by a network device. The method may be performed independently, or may be performed together with any other embodiment of the embodiments of the present disclosure. FIG. 1 is a flowchart of a method for sending downlink information according to some embodiments. As shown in FIG. 1, the method includes following steps.

In step 101, a transport block size scaling (TBS Scaling) processing mode corresponding to first downlink information is determined, the TBS Scaling processing mode including a first processing mode or a second processing mode, the first processing mode being a processing mode to perform TBS Scaling, and the second processing mode being a processing mode not to perform TBS Scaling.

In step 102, the first downlink information is sent in the TBS Scaling processing mode.

In some embodiments, the network device sends the first downlink information to the user equipment. The first downlink information is, for example, a message Msg. 4. The user equipment is, for example, a Redcap terminal. The network device firstly determines a TBS Scaling processing mode corresponding to sending the first downlink information, and then sends the first downlink information in the determined TBS Scaling processing mode.

In this embodiment, the network device determines a TBS Scaling processing mode corresponding to the first downlink information, and then sends the first downlink information using the processing mode, so that the user equipment can receive the first downlink information using a corresponding processing mode, thus realizing TBS Scaling processing when the first downlink information is sent and received.

According to embodiments of the present disclosure, there is provided a method for sending downlink information. The method is performed by a network device. The method may be performed independently, or may be performed together with any other embodiment of the embodiments of the present disclosure. FIG. 2 is a flowchart of a method for sending downlink information according to some embodiments, as shown in FIG. 2, the method includes following steps.

In step 201, a system message is sent, the system message including a system parameter.

In step 202, in response to the system parameter being less than or equal to a first set value, it is determined that the TBS Scaling processing mode corresponding to the first downlink information is the first processing mode; and, in response to the system parameter being greater than the first set value, it is determined that the TBS Scaling processing mode corresponding to the first downlink information is the second processing mode.

Alternatively, in response to the system parameter being greater than a second set value, it is determined that the TBS Scaling processing mode corresponding to the first downlink information is the first processing mode; and, in response to the system parameter being less than or equal to the second set value, it is determined that the TBS Scaling processing mode corresponding to the first downlink information is the second processing mode.

The first processing mode is a processing mode to perform TBS Scaling, and the second processing mode is a processing mode not to perform TBS Scaling.

In step 203, the first downlink information is sent in the TBS Scaling processing mode.

In some embodiments, the method may include following step.

In step 201*a*, a system parameter for indicating a TBS Scaling processing mode corresponding to first downlink information is sent, where the system parameter is used to indicate that the TBS Scaling processing mode corresponding to the first downlink information is a first processing mode, and the first processing mode is a processing mode to perform TBS Scaling.

That is, a processing mode not to perform TBS Scaling is used by default; and when the system parameter is sent, a processing mode to perform TBS Scaling is used.

In some other embodiments, the method may include following step.

In step 201*b*, a system parameter for indicating a TBS Scaling processing mode corresponding to first downlink information is sent, where the system parameter is used to indicate that the TBS Scaling processing mode corresponding to the first downlink information is the second processing mode, and the second processing mode is a processing mode not to perform TBS Scaling.

That is, a processing mode to perform TBS Scaling is used by default; and when the system parameter is sent, a processing mode not to perform TBS Scaling is used.

In some embodiments, the system parameter is a transmission power of the network device. The network device sends a system message, and the system message includes the transmission power of the network device. In response to the transmission power being less than or equal to the first set value, it is determined that the TBS Scaling processing mode corresponding to the first downlink information is the first processing mode; and, in response to the transmission power being greater than the first set value, it is determined that the TBS Scaling processing mode corresponding to the first downlink information is the second processing mode. For example, in response to the power spectral density of the network device being less than or equal to 24 dBM/Hz, it is determined that the TBS Scaling processing mode corresponding to the first downlink information is the first processing mode; and, in response to the power spectral density of the network device being greater than 24 dBM/Hz, it is determined that the TBS Scaling processing mode corresponding to the first downlink information is the second processing mode. Then, the first downlink information is sent in the determined TBS Scaling processing mode.

In some embodiments, the system parameter is a system parameter inversely proportional to the transmission power of the network device. That is, when the transmission power of the network device is relatively greater, the system parameter is relatively smaller; and, when the transmission power of the network device is relatively smaller, the system parameter is relatively greater. In this case, in response to the system parameter being greater than the second set value, it is determined that the TBS Scaling processing mode corresponding to the first downlink information is the first processing mode; and, in response to the system parameter being less than or equal to the second set value, it is determined that the TBS Scaling processing mode corresponding to the first downlink information is the second processing mode. Then, the first downlink information is sent in the determined TBS Scaling processing mode.

In this embodiment, the network device determines a TBS Scaling processing mode corresponding to first downlink information based on the system parameter condition, and processes and sends the first downlink information using a corresponding mode, so that the processing and sending of the first downlink information are more suitable for the current network condition, thus improving the effect of receiving and processing the first downlink information by the terminal device.

According to embodiments of the present disclosure, there is provided a method for sending downlink information. The method is performed by a network device. The method may be performed independently, or may be performed together with any other embodiment of the embodiments of the present disclosure. FIG. 3 is a flowchart of a method for sending downlink information according to some embodiments, as shown in FIG. 3, the method includes following steps.

In step 301, a broadcast channel is sent, the broadcast channel including first indication information, the first indication information including at least one mapping relationship, and the mapping relationship including a user equipment type and a corresponding TBS Scaling processing mode.

In step 302, a transmission block size scaling (TBS Scaling) processing mode corresponding to first downlink information is determined according to the first indication information, the TBS Scaling processing mode including a first processing mode or a second processing mode, the first processing mode being a processing mode to perform TBS Scaling, and the second processing mode being a processing mode not to perform TBS Scaling.

In step 303, the first downlink information is sent in the TBS Scaling processing mode.

In some embodiments, the network device sends first indication information through broadcast information, and the first indication information includes a mapping relationship between a user equipment type and a corresponding TBS Scaling processing mode, so that after receiving the first indication information, the user equipment determines a corresponding TBS Scaling processing mode according to its own user equipment type and the mapping relationship. The network device determines a TBS Scaling processing mode corresponding to the first downlink information according to the first indication information, and sends the first downlink information in the TBS Scaling processing mode.

In some embodiments, the method may include following step.

In step 301a, a broadcast channel for indicating a TBS Scaling processing mode corresponding to first downlink information is sent, where the broadcast channel is used to indicate that the TBS Scaling processing mode corresponding to the first downlink information is a first processing mode, and the first processing mode is a processing mode to perform TBS Scaling.

That is, a processing mode not to perform TBS Scaling is used by default; and when a corresponding broadcast channel is sent, a processing mode to perform TBS Scaling is used.

In some other embodiments, the method may include following step.

In step 301b, a broadcast channel for indicating a TBS Scaling processing mode corresponding to first downlink information is sent, where the broadcast channel is used to indicate that the TBS Scaling processing mode corresponding to the first downlink information is a second processing mode, and the second processing mode is a processing mode not to perform TBS Scaling.

That is, a processing mode to perform TBS Scaling is used by default; and when a corresponding broadcast channel is sent, a processing mode not to perform TBS Scaling is used.

In this embodiment, the network device may notify the used TBS Scaling processing mode to the user equipment with different types or the user equipment having different terminal capabilities, so that the user equipment receives and processes the first downlink information by using a more suitable TBS Scaling processing mode.

According to embodiments of the present disclosure, there is provided a method for sending downlink information. The method is performed by a network device. The method may be performed independently, or may be performed together with any other embodiment of the embodiments of the present disclosure. FIG. 4 is a flowchart of a method for sending downlink information according to some embodiments, as shown in FIG. 4, the method includes following steps.

In step 401, a broadcast channel is sent, the broadcast channel including second indication information, and the second indication information indicating whether a user equipment with a device type of Redcap uses a first processing mode.

In step 402, a transport block size scaling (TBS Scaling) processing mode corresponding to first downlink information is determined according to the second indication information, the TBS Scaling processing mode including a first processing mode or a second processing mode, the first processing mode being a processing mode to perform TBS Scaling, and the second processing mode being a processing mode not to perform TBS Scaling.

In step 403, the first downlink information is sent in the TBS Scaling processing mode.

In some embodiments, the network device sends second indication information through broadcast information, and the second indication information indicates whether the user equipment with a device type of Redcap uses the first processing mode, so that the Redcap terminal determines a corresponding TBS Scaling processing mode after receiving the second indication information. The network device determines a TBS Scaling processing mode corresponding to the first downlink information according to the second indication information, and sends the first downlink information in the TBS Scaling processing mode.

In some embodiments, the method may include following step.

In step 401*a*, second indication information is sent through a broadcast channel, where the second indication information is used to indicate that a TBS Scaling processing mode corresponding to first downlink information is a first processing mode, and the first processing mode is a processing mode to perform TBS Scaling.

That is, a processing mode not to perform TBS Scaling is used by default; and when a corresponding broadcast channel is sent, a processing mode to perform TBS Scaling is used.

In some other embodiments, the method may include following step.

In step 401*b*, second indication information is sent through a broadcast channel, where the second indication information is used to indicate that a TBS Scaling processing mode corresponding to first downlink information is a second processing mode, and the first second processing mode is a processing mode not to perform TBS Scaling.

That is, a processing mode to perform TBS Scaling is used by default; and when a corresponding broadcast channel is sent, a processing mode not to perform TBS Scaling is used.

In this embodiment, the network device may notify all Redcap terminals whether to use the first processing mode, so that the Redcap terminal uses a suitable TBS Scaling processing mode to receive and process the first downlink information, and the transmission efficiency of the information is improved.

According to embodiments of the present disclosure, there is provided a method for sending downlink information. The method is performed by a network device. The method may be performed independently, or may be performed together with any other embodiment of the embodiments of the present disclosure. FIG. 5 is a flowchart of a method for sending downlink information according to some embodiments, as shown in FIG. 5, the method includes following steps.

In step 501, second downlink information is sent.

In step 502, a transport block size scaling (TBS Scaling) processing mode corresponding to first downlink information is determined according to at least one of following information corresponding to the second downlink information: whether to use TBS Scaling, and a scaling factor when using TBS Scaling, the TBS Scaling processing mode including a first processing mode or a second processing mode, the first processing mode being a processing mode to perform TBS Scaling, and the second processing mode being a processing mode not to perform TBS Scaling.

In step 503, the first downlink information is sent in the TBS Scaling processing mode.

With a same principle as the foregoing embodiments, there may be a default processing mode: when a non-default processing mode is used, the second downlink information needs to be sent; and, if the second downlink information is not sent, a default processing mode is used. Among them, the default processing mode may be a first processing mode or a second processing mode. Therefore, the principle is similar to the principles of step 201*a* and step 201*b*, as well as step 301*a* and step 301*b*, as well as step 401*a* and step 401*b*, and details will not be described here again.

In some embodiments, the network device sends the second downlink information (if needed) before or after or at a same time as sending the first downlink information, determines a TBS Scaling processing mode corresponding to the first downlink information according to the information corresponding to the second downlink information, and sends the first downlink information in the TBS Scaling processing mode. The information corresponding to the second downlink information is, for example, at least one of the following: whether to use TBS Scaling, and a scaling factor when using TBS Scaling.

In some embodiments, the second downlink information is a message Msg. 2. The network device determines a TBS Scaling processing mode corresponding to the first downlink information according to whether TBS Scaling is used for sending the message Msg. 2. For example, in response to TBS Scaling being used for sending the message Msg. 2, the network device determines that the TBS Scaling processing mode corresponding to the first downlink information is the first processing mode.

In some embodiments, the second downlink information is a message Msg. 2. The network device determines a TBS Scaling processing mode corresponding to the first downlink information according to whether TBS Scaling is used for sending the message Msg. 2 and a scaling factor when using TBS Scaling. For example, in response to TBS Scaling being used for sending the message Msg. 2, and the used scaling factor being less than or equal to a set value, for example, 0.5, the network device determines that the TBS Scaling processing mode corresponding to the first downlink information is the first processing mode.

In this embodiment, the network device determines the TBS Scaling processing mode corresponding to the first downlink information based on the information corresponding to the second downlink information sent before or after or at a same time as sending the first downlink information, so that the processing and sending of the first downlink information are more suitable for the current network condition and system setting, thus improving the effect of receiving and processing the first downlink information by the terminal device.

According to embodiments of the present disclosure, there is provided a method for sending downlink information. The method is performed by a network device. The method may be performed independently, or may be performed together with any other embodiment of the embodiments of the present disclosure. The method includes following steps.

Second downlink information is sent. When the scaling factor when using TBS Scaling corresponding to the second downlink information is less than or equal to a set factor, it is determined that a transport block size scaling (TBS Scaling) processing mode corresponding to the first downlink information is a first processing mode. When the scaling factor when using TBS Scaling corresponding to the second downlink information is greater than the set factor, it is determined that a transport block size scaling (TBS Scaling) processing mode corresponding to the first downlink information is a second processing mode. The first downlink information is sent in the TBS Scaling processing mode.

With a same principle as the foregoing embodiments, there may be a default processing mode: when a non-default processing mode is used, the second downlink information needs to be sent; and, if the second downlink information is not sent, a default processing mode is used. Among them, the default processing mode may be a first processing mode or a second processing mode. Therefore, the principle is similar to the principles of step 201*a* and step 201*b*, as well as step 301*a* and step 301*b*, as well as step 401*a* and step 401*b*, and details will not be described here again.

In some embodiments, the network device sends the second downlink information (if needed) before or after or at a same time as sending the first downlink information, determines a TBS Scaling processing mode corresponding to the first downlink information according to the scaling factor when using TBS Scaling corresponding to the second downlink information, and sends the first downlink information in the TBS Scaling processing mode.

In some embodiments, the second downlink information is a message Msg. 2. For example, when the scaling factor when using TBS Scaling to send the message Msg. 2 is less than or equal to a set value, for example, 0.5, the network device determines that the TBS Scaling processing mode corresponding to the first downlink information is the first processing mode. For example, when the scaling factor when using TBS Scaling to send the message Msg. 2 is greater than another set value, for example, 0.75, the network device determines that the TBS Scaling processing mode corresponding to the first downlink information is the second processing mode.

In this embodiment, the network device determines a TBS Scaling processing mode corresponding to the first downlink information based on a scaling factor when using TBS Scaling corresponding to the second downlink information sent before or after or at a same time as sending the first downlink information, so that the processing and sending of the first downlink information are more suitable for the current system setting, thus improving the effect of receiving and processing the first downlink information by the terminal device.

According to embodiments of the present disclosure, there is provided a method for sending downlink information. The method is performed by a network device. The method may be performed independently, or may be performed together with any other embodiment of the embodiments of the present disclosure. FIG. 6 is a flowchart of a method for sending downlink information according to some embodiments, as shown in FIG. 6, the method includes following steps.

In step 601, first uplink information is received.

In step 602, a transport block size scaling (TBS Scaling) processing mode corresponding to first downlink information is determined according to a transmission scheme corresponding to the first uplink information, the TBS Scaling processing mode including a first processing mode or a second processing mode, the first processing mode being a processing mode to perform TBS Scaling, and the second processing mode being a processing mode not to perform TBS Scaling.

In step 603, the first downlink information is sent in the TBS Scaling processing mode.

With a same principle as the foregoing embodiments, there may be a default processing mode: when a non-default processing mode is used, the first uplink information needs to be sent; and, if the first uplink information is not sent, a default processing mode is used. Among them, the default processing mode may be a first processing mode or a second processing mode. Therefore, the principle is similar to the principles of step 201*a* and step 201*b*, as well as step 301*a* and step 301*b*, as well as step 401*a* and step 401*b*, and details will not be described here again.

In some embodiments, the network device receives first uplink information before or after or at a same time as sending the first downlink information, determines a TBS Scaling processing mode corresponding to the first downlink information according to a transmission scheme corresponding to the first uplink information, and sends the first downlink information in the TBS Scaling processing mode.

In some embodiments, the first uplink information is a message Msg. 3, and the first downlink information is a message Msg. 4. The network device receives the message Msg. 3 from the user equipment, and determines the TBS Scaling processing mode corresponding to the first downlink information according to whether the transmission scheme corresponding to the message Msg. 3 uses repeated transmission. For example, when the transmission scheme corresponding to the message Msg. 3 uses repeated transmission, it is determined that the TBS Scaling processing mode corresponding to the first downlink information is the first processing mode, and the first downlink information is sent in the TBS Scaling processing mode.

In this embodiment, the network device determines the TBS Scaling processing mode corresponding to the first downlink information based on the transmission scheme corresponding to the first uplink information received before or after or at a same time as sending the first downlink information, so that the processing and sending of the first downlink information are more suitable for the current system setting, thus improving the effect of receiving and processing the first downlink information by the terminal device.

According to embodiments of the present disclosure, there is provided a method for receiving downlink information. The method is performed by a user equipment. The method may be performed independently, or may be performed together with any other embodiment of the embodiments of the present disclosure. FIG. 7 is a flowchart of a method for receiving downlink information according to some embodiments, as shown in FIG. 7, the method includes following steps.

In step 701, a transport block size scaling (TBS Scaling) processing mode corresponding to first downlink information is determined, the TBS Scaling processing mode including a first processing mode or a second processing mode, the first processing mode being a processing mode to perform TBS Scaling, and the second processing mode being a processing mode not to perform TBS Scaling.

In step 702, the first downlink information is received in the TBS Scaling processing mode.

In some embodiments, the first downlink information may be, for example, a message Msg. 4. The user equipment is, for example, a Redcap terminal. The user equipment determines a TBS Scaling processing mode corresponding to the first downlink information, and receives the first downlink information in the TBS Scaling processing mode.

In this embodiment, the user equipment determines a TBS Scaling processing mode corresponding to the first downlink information, and then receives the first downlink information using a corresponding processing mode, thus realizing TBS Scaling processing when the first downlink information is sent and received.

According to embodiments of the present disclosure, there is provided a method for receiving downlink information. The method is performed by a user equipment. The method may be performed independently, or may be performed together with any other embodiment of the embodiments of the present disclosure. FIG. 8 is a flowchart of a method for receiving downlink information according to some embodiments, as shown in FIG. 8, the method includes following steps.

In step 801, a transport block size scaling (TBS Scaling) processing mode corresponding to first downlink information is determined according to a device type of the user equipment, the TBS Scaling processing mode including a first processing mode or a second processing mode, the first processing mode being a processing mode to perform TBS Scaling, and the second processing mode being a processing mode not to perform TBS Scaling.

In step 802, the first downlink information is received in the TBS Scaling processing mode.

In some embodiments, the user equipment determines a TBS Scaling processing mode corresponding to the first downlink information according to its own device type, such as hardware configuration, and receives the first downlink information in the TBS Scaling processing mode. In some embodiments, the user equipment determines that its own device type is a Redcap terminal, determines that the TBS scaling processing mode corresponding to the first downlink information is the first processing mode, and receives the first downlink information in the first processing mode.

In this embodiment, the user equipment determines a TBS Scaling processing mode corresponding to the first downlink information according to its own device type, so that the user equipment receives and processes the first downlink information using a more suitable TBS Scaling processing mode.

According to embodiments of the present disclosure, there is provided a method for receiving downlink information. The method is performed by a user equipment. The method may be performed independently, or may be performed together with any other embodiment of the embodiments of the present disclosure. FIG. 9 is a flowchart of a method for receiving downlink information according to some embodiments, as shown in FIG. 9, the method includes following steps.

In step 901, a system message is received, the system message including a system parameter.

In step 902, in response to the system parameter being less than or equal to a first set value, it is determined that the TBS Scaling processing mode corresponding to the first downlink information is a first processing mode; in response to the system parameter being greater than the first set value, it is determined that the TBS Scaling processing mode corresponding to the first downlink information is a second processing mode.

Alternatively, in response to the system parameter being greater than a second set value, it is determined that the TBS Scaling processing mode corresponding to the first downlink information is a first processing mode; in response to the system parameter being less than or equal to the second set value, it is determined that the TBS Scaling processing mode corresponding to the first downlink information is a second processing mode.

The first processing mode is a processing mode to perform TBS Scaling, and the second processing mode is a processing mode not to perform TBS Scaling.

In step 903, the first downlink information is received in the TBS Scaling processing mode.

In some embodiments, the system parameter is a transmission power of the network device. The user equipment receives a system message, and the system message includes the transmission power of the network device. In response to the transmission power being less than or equal to a first set value, it is determined that the TBS Scaling processing mode corresponding to the first downlink information is a first processing mode; and in response to the transmission power being greater than the first set value, it is determined that the TBS Scaling processing mode corresponding to the first downlink information is a second processing mode. Then, the user equipment receives the first downlink information in a determined TBS Scaling processing mode.

In some embodiments, the system parameter is a system parameter inversely proportional to the transmission power of the network device. In response to the system parameter being greater than a second set value, it is determined that the TBS Scaling processing mode corresponding to the first downlink information is a first processing mode; in response to the system parameter being less than or equal to the second set value, it is determined that the TBS Scaling processing mode corresponding to the first downlink information is a second processing mode. Then, the user equipment receives the first downlink information in a determined TBS Scaling processing mode.

In some embodiments, the method may include following step.

In step 901*a*, a system parameter for indicating a TBS Scaling processing mode corresponding to first downlink information is received, where the system parameter is used to indicate that the TBS Scaling processing mode corresponding to the first downlink information is a first processing mode, and the first processing mode is a processing mode to perform TBS Scaling.

That is, a processing mode not to perform TBS Scaling is used by default; and when the system parameter is sent, a processing mode to perform TBS Scaling is used.

In some other embodiments, the method may include following step.

In step 901*b*, a system parameter for indicating a TBS Scaling processing mode corresponding to first downlink information is received, where the system parameter is used to indicate that the TBS Scaling processing mode corresponding to the first downlink information is a second processing mode, and the second processing mode is a processing mode not to perform TBS Scaling.

That is, a processing mode to perform TBS Scaling is used by default; and when the system parameter is received, a processing mode not to perform TBS Scaling is used.

In this embodiment, the user equipment determines a TBS Scaling processing mode corresponding to first downlink information based on the system parameter condition, and receives the first downlink information using a corresponding mode, so that the receiving of the first downlink information is more suitable for the current network condition, thus improving the effect of receiving and processing the first downlink information by the terminal device.

According to embodiments of the present disclosure, there is provided a method for receiving downlink information. The method is performed by a user equipment. The method may be performed independently, or may be performed together with any other embodiment of the embodiments of the present disclosure. FIG. 10 is a flowchart of a method for receiving downlink information according to some embodiments, as shown in FIG. 10, the method includes following steps.

In step 1001, a broadcast channel is received, the broadcast channel including first indication information, the first indication information including at least one mapping relationship, and the mapping relationship including a user equipment type and a corresponding TBS Scaling processing mode.

In step 1002, a transmission block size scaling (TBS Scaling) processing mode corresponding to first downlink information is determined according to a device type of the user equipment and the first indication information, the TBS Scaling processing mode including a first processing mode or a second processing mode, the first processing mode being a processing mode to perform TBS Scaling, and the second processing mode being a processing mode not to perform TBS Scaling.

In step 1003, the first downlink information is received in the TBS Scaling processing mode.

In some embodiments, the user equipment receives the first indication information through broadcast information, and the first indication information includes a mapping relationship between an user equipment type and a corresponding TBS Scaling processing mode, so that the user equipment determines a corresponding TBS Scaling processing mode according to its own user equipment type and the mapping relationship after receiving the first indication information, and receives the first downlink information in the TBS Scaling processing mode.

In some embodiments, the method may include following step.

In step 1001*a*, a broadcast channel for indicating a TBS Scaling processing mode corresponding to first downlink information is received, where the broadcast channel is used to indicate that the TBS Scaling processing mode corresponding to the first downlink information is a first processing mode, and the first processing mode is a processing mode to perform TBS Scaling.

That is, a processing mode not to perform TBS Scaling is used by default; when the corresponding broadcast channel is received, a processing mode to perform TBS Scaling is used.

In some other embodiments, the method may include following step.

In step 1001*b*, a broadcast channel for indicating a TBS Scaling processing mode corresponding to first downlink information is received, where the broadcast channel is used to indicate that the TBS Scaling processing mode corresponding to the first downlink information is a second processing mode, and the second processing mode is a processing mode not to perform TBS Scaling.

That is, a processing mode to perform TBS Scaling is used by default; and when the corresponding broadcast channel is received, a processing mode not to perform TBS Scaling is used.

In this embodiment, the user equipment may use a more suitable TBS Scaling processing mode to receive and process the first downlink information according to the notification from the network device.

According to embodiments of the present disclosure, there is provided a method for receiving downlink information. The method is performed by a user equipment. The method may be performed independently, or may be performed together with any other embodiment of the embodiments of the present disclosure. FIG. 11 is a flowchart of a method for receiving downlink information according to some embodiments, as shown in FIG. 11, the method includes following steps.

In step 1101, a broadcast channel is received, the broadcast channel including second indication information, and the second indication information indicating whether a user equipment with a device type of Redcap uses a first processing mode.

In step 1102, a transport block size scaling (TBS Scaling) processing mode corresponding to first downlink information is determined according to a device type of the user equipment and the second indication information, the TBS Scaling processing mode including a first processing mode or a second processing mode, the first processing mode being a processing mode to perform TBS Scaling, and the second processing mode being a processing mode not to perform TBS Scaling.

In step 1103, the first downlink information is received in the TBS Scaling processing mode.

In some embodiments, the user equipment receives second indication information through broadcast information, and the second indication information indicates whether the user equipment with a device type of Redcap uses the first processing mode, so that the Redcap terminal determines a corresponding TBS Scaling processing mode after receiving the second indication information, and receives the first downlink information in the TBS Scaling processing mode.

In some embodiments, the method may include following step.

In step 1101*a*, second indication information is received through a broadcast channel, where the second indication information is used to indicate that a TBS Scaling processing mode corresponding to first downlink information is a first processing mode, and the first processing mode is a processing mode to perform TBS Scaling.

That is, a processing mode not to perform TBS Scaling is used by default; when a corresponding broadcast channel is received, a processing mode to perform TBS Scaling is used.

In some other embodiments, the method may include following step.

In step 1101*b*, second indication information is received through a broadcast channel, where the second indication information is used to indicate that a TBS Scaling processing mode corresponding to first downlink information is a second processing mode, and the second processing mode is a processing mode not to perform TBS Scaling.

That is, a processing mode to perform TBS Scaling is used by default; and when a corresponding broadcast channel is received, a processing mode not to perform TBS Scaling is used.

In this embodiment, in the condition that the user equipment is a Redcap terminal, the user equipment may determine whether to use the first processing mode based on the notification from the network device, so that the Redcap terminal uses a suitable TBS Scaling processing mode to receive and process the first downlink information, and the transmission efficiency of the information is improved.

According to embodiments of the present disclosure, there is provided a method for receiving downlink information. The method is performed by a user equipment. The method may be performed independently, or may be performed together with any other embodiment of the embodiments of the present disclosure. The method includes following steps.

In response to not receiving third indication information from a network device, it is determined that a transport block size scaling (TBS Scaling) processing mode corresponding to first downlink information is a first processing mode or a second processing mode, where the third indication information is used to indicate information for determining the transport block size scaling (TBS Scaling) processing mode corresponding to the first downlink information, the first processing mode is a processing mode to perform TBS Scaling, and the second processing mode is a processing mode not to perform TBS Scaling;

The first downlink information is received in the TBS Scaling processing mode.

In some embodiments, the user equipment does not receive third indication information from the network device, and the third indication information is used to indicate information for determining the used TBS Scaling processing mode. At this time, for example, a mode provided in the communication protocol may be used to determine that the TBS Scaling processing mode corresponding to the first downlink information is a first processing mode or a second processing mode, so that the user equipment receives the first downlink information in the TBS Scaling processing mode.

In this embodiment, even if in the condition of not receiving information about the used TBS Scaling processing mode from the network device, the user equipment may determine the TBS Scaling processing mode corresponding to the first downlink information based on the provision of the communication protocol, so that the user equipment can normally receive the first downlink information.

According to embodiments of the present disclosure, there is provided a method for receiving downlink information. The method is performed by a user equipment. The method may be performed independently, or may be performed together with any other embodiment of the embodiments of the present disclosure. FIG. 12 is a flowchart of a method for receiving downlink information according to some embodiments, as shown in FIG. 12, the method includes following steps.

In step 1201, second downlink information is received.

In step 1202, a transport block size scaling (TBS Scaling) processing mode corresponding to first downlink information is determined according to at least one of the following information corresponding to the second downlink information: whether to use TBS Scaling, and a scaling factor when using TBS Scaling, the TBS Scaling processing mode including a first processing mode or a second processing mode, the first processing mode being a processing mode to perform TBS Scaling, and the second processing mode being a processing mode not to perform TBS Scaling.

In step 1203, the first downlink information is received in the TBS Scaling processing mode.

In some embodiments, the user equipment receives the second downlink information before or after or at a same time as receiving the first downlink information, determines a TBS Scaling processing mode corresponding to the first downlink information according to the information corresponding to the second downlink information, and receives the first downlink information in the TBS Scaling processing mode. The information corresponding to the second downlink information is, for example, at least one of the following: whether to use TBS Scaling, and a scaling factor when using TBS Scaling.

In this embodiment, the user equipment determines the TBS Scaling processing mode corresponding to the first downlink information based on the information corresponding to the second downlink information received before or after or at a same as receiving the first downlink information, so that the receiving of the first downlink information is more suitable for the current network condition and system setting, thus improving the effect of receiving the first downlink information by the terminal device.

According to embodiments of the present disclosure, there is provided a method for receiving downlink information. The method is performed by a user equipment. The method may be performed independently, or may be performed together with any other embodiment of the embodiments of the present disclosure. The method includes following steps.

Determining a transport block size scaling (TBS Scaling) processing mode corresponding to first downlink information according to a scaling factor when using TBS Scaling corresponding to second downlink information includes following steps.

The second downlink information is received;

When the scaling factor when using TBS Scaling corresponding to the second downlink information is less than or equal to a set factor, it is determined that the transport block size scaling (TBS Scaling) processing mode corresponding to the first downlink information is a first processing mode; when the scaling factor when using TBS Scaling corresponding to the second downlink information is greater than the set factor, it is determined that the transport block size scaling (TBS Scaling) processing mode corresponding to the first downlink information is a second processing mode;

The first downlink information is received in the TBS Scaling processing mode.

In some embodiments, the user equipment receives the second downlink information before or after or at a same time as receiving the first downlink information, determines a TBS Scaling processing mode corresponding to the first downlink information according to the scaling factor when using TBS Scaling corresponding to the second downlink information, and receives the first downlink information in the TBS Scaling processing mode.

In this embodiment, the user equipment determines the TBS Scaling processing mode corresponding to the first downlink information based on the scaling factor when using TBS Scaling corresponding to the second downlink information received before or after or at a same time as receiving the first downlink information, so that the receiving of the first downlink information is more suitable for the current system setting, thus improving the effect of receiving the first downlink information by the terminal device.

Figure 13:
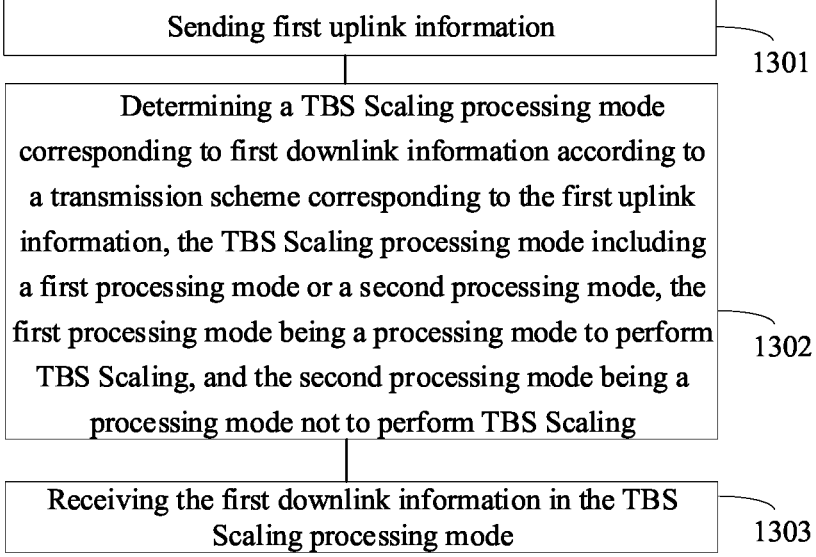
FIG. 13 is a flowchart of a method for receiving downlink information according to some embodiments.

According to embodiments of the present disclosure, there is provided a method for receiving downlink information. The method is performed by a user equipment. The method may be performed independently, or may be performed together with any other embodiment of the embodiments of the present disclosure. FIG. 13 is a flowchart of a method for receiving downlink information according to some embodiments, as shown in FIG. 13, the method includes following steps.

In step 1301, first uplink information is sent.

In step 1302, a transport block size scaling (TBS Scaling) processing mode corresponding to first downlink information is determined according to a transmission scheme corresponding to the first uplink information, the TBS Scaling processing mode including a first processing mode or a second processing mode, the first processing mode being a processing mode to perform TBS Scaling, and the second processing mode being a processing mode not to perform TBS Scaling.

In step 1303, the first downlink information is received in the TBS Scaling processing mode.

In some embodiments, the user equipment sends the first uplink information, determines a TBS Scaling processing mode corresponding to first downlink information according to a transmission scheme corresponding to the first uplink information, and receives the first downlink information in the TBS Scaling processing mode.

In this embodiment, the user equipment determines the TBS Scaling processing mode corresponding to the first downlink information based on the transmission scheme corresponding to the first uplink information, so that the receiving of the first downlink information is more suitable for the current system setting, thus improving the effect of receiving the first downlink information by the terminal device.

According to embodiments of the present disclosure, there is provided a method for receiving downlink information. The method is performed by a user equipment. The method may be performed independently, or may be performed together with any other embodiment of the embodiments of the present disclosure. FIG. 14 is a flowchart of a method for receiving downlink information according to some embodiments, as shown in FIG. 14, the method includes following steps.

In step 1401, a channel state of a downlink channel is measured.

In step 1402, a transport block size scaling (TBS Scaling) processing mode corresponding to first downlink information is determined according to the channel state, the TBS Scaling processing mode including a first processing mode or a second processing mode, the first processing mode being a processing mode to perform TBS Scaling, and the second processing mode being a processing mode not to perform TBS Scaling.

In step 1403, the first downlink information is received in the TBS Scaling processing mode.

In some embodiments, the channel state is a reference signal receiving power (RSRP). The user equipment measures the RSRP of the downlink channel, determines the TBS Scaling processing mode corresponding to the first downlink information based on the measurement result, and receives the first downlink information in the TBS Scaling processing mode.

In this embodiment, the user equipment determines a TBS Scaling processing mode corresponding to first downlink information based on a channel state, so that the receiving of the first downlink information is more suitable for the current network environment, thus improving the effect of receiving the first downlink information by the terminal device.

According to embodiments of the present disclosure, there is provided a method for receiving downlink information. The method is performed by a user equipment. The method may be performed independently, or may be performed together with any other embodiment of the embodiments of the present disclosure. The method includes following steps.

A channel state of a downlink channel is measured;

A time-frequency resource of a corresponding physical random access channel (PRACH) is determined according to the channel state, and a TBS Scaling processing mode is determined according to the time-frequency resource and a corresponding relationship, the corresponding relationship including a corresponding relationship between the time-frequency resource and the TBS Scaling processing mode;

The first downlink information is received in the TBS Scaling processing mode.

In some embodiments, the channel state is RSRP. The user equipment measures the RSRP of the downlink channel, determines a time-frequency resource of a corresponding PRACH based on the measurement result, and then determines a TBS Scaling processing mode based on the determined time-frequency resource. For example, the TBS Scaling processing mode corresponding to the time-frequency resource is determined based on a corresponding relationship between the time-frequency resource and the TBS Scaling processing mode as well as the determined time-frequency resource.

In some embodiments, when the RSRP measurement value is within a first range, it is determined that the time-frequency resource of the corresponding PRACH is resource #M-resource #N; when the RSRP measurement value is within a second range, it is determined that the time-frequency resource of the corresponding PRACH is resource #K-resource #L. When the determined time-frequency resource of the PRACH is within the range of resource #M-resource #N, the processing mode corresponding to the time-frequency resource is a first processing mode; when the determined time-frequency resource of the PRACH is within the range of resource #K-resource #L, the processing mode corresponding to the time-frequency resource is a second processing mode, as shown in Table 1. The corresponding relationship shown in Table 1 is an example, and may also be adjusted according to actual applications.

TABLE 1

| RSRP Measurement Value | Time-Frequency Resource of PRACH | Corresponding Processing Mode |
|---|---|---|
| First Range | Resource #M-Resource #N | First Processing Mode |
| Second Range | Resource #K-Resource #L | Second Processing Mode |

In this embodiment, the user equipment determines a TBS Scaling processing mode corresponding to first downlink information based on a channel state, so that the receiving of the first downlink information is more suitable for the current network environment, thus improving the effect of receiving the first downlink information by the terminal device.

According to embodiments of the present disclosure, there is provided a method for receiving downlink information. The method is performed by a user equipment. The method may be performed independently, or may be performed together with any other embodiment of the embodiments of the present disclosure. The method includes following steps.

A system message is received, the system message including a system parameter;

A device type of the user equipment is determined;

A TBS Scaling processing mode corresponding to first downlink information is determined based on the system parameter and the device type;

The first downlink information is received in the TBS Scaling processing mode.

In some embodiments, the user equipment receives a system message, determines a system parameter, and determines a device type of the user equipment. As described above, it can be determined that the TBS Scaling processing mode is a first processing mode or a second processing mode based on the system parameter, and it can also be determined that the TBS Scaling processing mode is the first processing mode or the second processing mode based on the device type. That is, the system parameter received by the user equipment may indicate that the user equipment uses the first processing mode or the second processing mode, and the device type of the user equipment may also indicate that the user equipment uses the first processing mode or the second processing mode. In response to both the system parameter and the device type indicating the first processing mode, it is determined that the TBS Scaling processing mode corresponding to the first downlink information is the first processing mode; and, in response to both the system parameter and the device type indicating the second processing mode, it is determined that the TBS Scaling processing mode corresponding to the first downlink information is the second processing mode.

In some embodiments, if the TBS Scaling processing modes indicated by the system parameter and the device type are different, the TBS Scaling processing mode corresponding to the first downlink information in this condition may be determined through a predefined mode in the communication protocol. The predefined mode may be, for example, as shown in Table 2 or Table 3.

TABLE 2

| Processing Mode Indicated By System Parameter | Processing Mode Indicated By Device type | Predefined Processing Mode |
|---|---|---|
| First Processing Mode | Second Processing Mode | First Processing Mode |
| Second Processing Mode | First Processing Mode | Second Processing Mode |

TABLE 3

| Processing Mode Indicated By System Parameter | Processing Mode Indicated By Device type | Predefined Processing Mode |
|---|---|---|
| First Processing Mode | Second Processing Mode | Second Processing Mode |
| Second Processing Mode | First Processing Mode | First Processing Mode |

According to embodiments of the present disclosure, there is provided an apparatus for sending downlink information, applied to a network device, and as shown in FIG. 15, including a processing module 1501 and communication module 1502.

The processing module 1501 is configured to determine a transport block size scaling (TBS Scaling) processing mode corresponding to first downlink information, the TBS Scaling processing mode including a first processing mode or a second processing mode, the first processing mode being a processing mode to perform TBS Scaling, and the second processing mode being a processing mode not to perform TBS Scaling.

The communication module 1502 is configured to send the first downlink information in the TBS Scaling processing mode.

In some embodiments, the processing module of the apparatus for sending downlink information shown in FIG. 15 may be configured to perform the steps of any one of the foregoing methods for sending downlink information.

According to embodiments of the present disclosure, there is provided an apparatus for receiving downlink information, applied to a user equipment, and as shown in FIG. 16, including a processing module 1601 and communication module 1602.

The processing module 1601 is configured to determine a transport block size scaling (TBS Scaling) processing mode corresponding to first downlink information, the TBS Scaling processing mode including a first processing mode or a second processing mode, the first processing mode being a processing mode to perform TBS Scaling, and the second processing mode being a processing mode not to perform TBS Scaling.

The communication module 1602 is configured to receive the first downlink information in the TBS Scaling processing mode.

In some embodiments, the processing module of the apparatus for receiving downlink information shown in FIG. 16 may be configured to perform the steps of any one of the foregoing methods for receiving downlink information.

According to embodiments of the present disclosure, there is provided a network side device, including a processor and a memory that is configured to store an executable instruction by the processor. The processor is configured to execute the executable instruction in the memory to implement the steps of the above method for sending downlink information.

According to embodiments of the present disclosure, there is provided a mobile terminal, including a processor and a memory, configured to store an executable instruction by the processor. The processor is configured to execute the executable instruction in the memory to implement the steps of the above method for receiving the downlink information.

According to embodiments of the present disclosure, there is provided a non-transitory computer-readable storage medium storing with an executable instruction; when the executable instruction is executed by a processor, the steps of the above method for sending downlink information or the above method for receiving downlink information are implemented.

Figure 17:
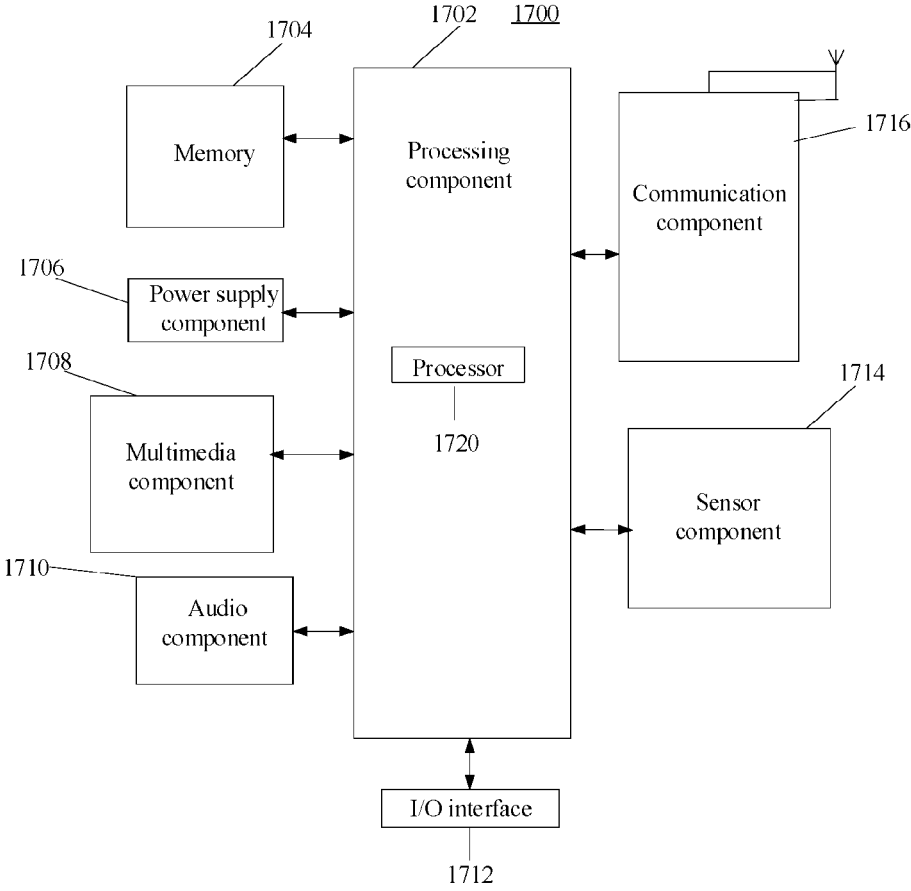
FIG. 17 is a structural diagram of an apparatus for sending receiving downlink information according to some embodiments.

FIG. 17 is a block diagram of an apparatus 1700 for receiving downlink information according to some embodiments. For example, the apparatus 1700 may be a mobile phone, a computer, a digital broadcast terminal, a message transceiver, a game console, a tablet device, a medical device, a fitness device, a personal digital assistant, etc.

Referring to FIG. 17, the apparatus 1700 may include one or more of the following components: a processing component 1702, a memory 1704, a power supply component 1706, a multimedia component 1708, an audio component 1710, an input/output (I/O) interface 1712, a sensor component 1714, and a communication component 1716.

The processing component 1702 generally controls the overall operation of the apparatus 1700, such as operations associated with display, telephone calls, data communications, camera operations, and recording operations. The processing component 1702 may include one or more processors 1720 to execute instructions to complete all or some of the steps of the above method. In addition, the processing component 1702 may include one or more modules to facilitate interaction between the processing component 1702 and other components. For example, the processing component 1702 may include a multimedia module to facilitate interaction between the multimedia component 1708 and the processing component 1702.

The memory 1704 is configured to store various types of data to support operations at the apparatus 1700. Examples of such data include instructions for any application or method operated on the apparatus 1700, contact data, phonebook data, messages, pictures, videos, or the like. The memory 1704 may be implemented by any type of volatile or non-volatile storage device or a combination of them, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk, or an optical disk.

The power supply component 1706 provides electrical power for various components of the apparatus 1700. The power supply component 1706 may include a power management system, one or more power sources, and other components associated with generating, managing, and allocating power for the apparatus 1700.

The multimedia component 1708 includes a screen providing an output interface between the apparatus 1700 and a user. In some embodiments, the screen may include a liquid crystal display (LCD) and a touch panel (TP). If the screen includes a touch panel, the screen may be implemented as a touch screen to receive an input signal from a user. The touch panel includes one or more touch sensors to sense touching, sliding, and gestures on the touch panel. The touch sensor may not only sense a boundary of a touching or sliding action, but also detect a duration and pressure associated with the touching or sliding action. In some embodiments, the multimedia component 1708 includes a front-facing camera and/or a rear-facing camera. When the apparatus 1700 is in an operation mode, such as a photographing mode or a video mode, the front-facing camera and/or the rear-facing camera may receive external multimedia data. Each front-facing camera or rear-facing camera may be a fixed optical lens system or has a focal length and an optical zoom capability.

The audio component 1710 is configured to output and/or input an audio signal. For example, the audio component 1710 includes a microphone (MIC) configured to receive an external audio signal when the apparatus 1700 is in an operating mode, such as a call mode, a recording mode, and a speech recognition mode. The received audio signal may be further stored in the memory 1704 or sent via the communication component 1716. In some embodiments, the audio component 1710 further includes a speaker configured to output an audio signal.

The I/O interface 1712 provides an interface between the processing component 1702 and a peripheral interface module. The peripheral interface module may be a keyboard, a click wheel, a button, or the like. The button may include, but is not limited to, a home button, a volume button, a start button, and a lock button.

The sensor component 1714 includes one or more sensors for providing status assessments of various aspects for the apparatus 1700. For example, the sensor component 1714 may detect the on/off state of the apparatus 1700, and the relative positioning of the components, for example, the components are the display and the keypad of the apparatus 1700. The sensor component 1714 may also detect the position change of the apparatus 1700 or a component of the apparatus 1700, the presence or absence of the contact between a user and the apparatus 1700, the orientation or acceleration/deceleration of the apparatus 1700, and the temperature change of the apparatus 1700. The sensor component 1714 may include a proximity sensor configured to detect presence of nearby objects without any physical contact. The sensor component 1714 may also include an optical sensor, such as a CMOS or CCD image sensor, for use in imaging applications. In some embodiments, the sensor component 1714 may further include an acceleration sensor, a gyroscope sensor, a magnetic sensor, a pressure sensor, or a temperature sensor.

The communication component 1716 is configured to facilitate wired or wireless communication between the apparatus 1700 and other devices. The apparatus 1700 may access a wireless network based on a communication standard, such as WiFi, 2G, or 3G, or a combination of them. In some embodiments, the communication component 1716 receives broadcast signals or broadcast related information from an external broadcast management system via a broadcast channel. In some embodiments, the communication component 1716 further includes a near field communication (NFC) module to facilitate short-range communication. For example, the NFC module may be implemented based on a radio frequency identification (RFID) technology, an infrared data association (IrDA) technology, an ultra-wideband (UWB) technology, a Bluetooth (BT) technology, and other technologies.

In some embodiments, the apparatus 1700 may be implemented by one or more application specific integrated circuits (ASIC), digital signal processors (DSP), digital signal processing devices (DSPD), programmable logic devices (PLD), field programmable gate arrays (FPGA), controllers, microcontrollers, microprocessors, or other electronic components for performing the above methods.

In some embodiments, there is also provided a non-transitory computer-readable storage medium including an instruction, such as a memory 1704 including an instruction. The instruction is executable by the processor 1720 of the apparatus 1700 to complete the above method. For example, the non-transitory computer-readable storage medium may be a ROM, a random access memory (RAM), a CD-ROM, a magnetic tape, a floppy disk, an optical data storage device, etc.

Figure 18:
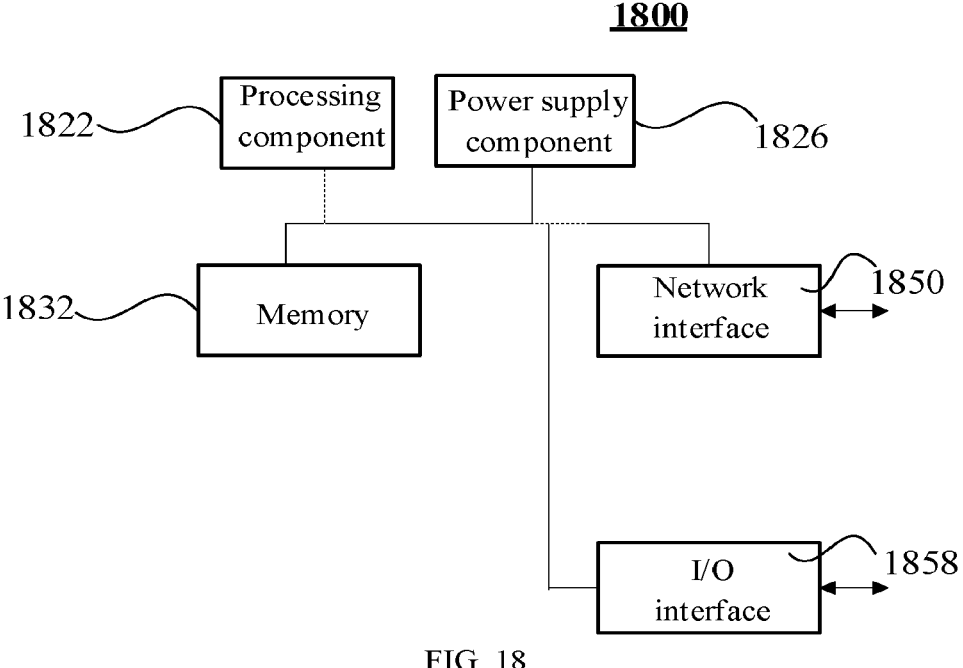
FIG. 18 is a structural diagram of an apparatus for sending receiving downlink information according to some embodiments

FIG. 18 is a block diagram of an apparatus 1800 for sending downlink information according to some embodiments. For example, the apparatus 1800 may be provided as a base station. Referring to FIG. 18, the apparatus 1800 includes a processing component 1822 further including one or more processors, and memory resources represented by the memory 1832 for storing instructions executable by the processing component 1822, such as an application. The application stored in the memory 1832 may include one or more modules each corresponding to a set of instructions. In addition, the processing component 1822 is configured to execute an instruction to perform the above method for sending downlink information.

The apparatus 1800 may further include a power supply component 1826 configured to perform power management of the apparatus 1800, a wired or wireless network interface 1850 configured to connect the apparatus 1800 to a network, and an input/output (I/O) interface 1858. The apparatus 1800 may operate based on an operating system stored in the memory 1832, such as Windows Server™, Mac OS X™, Unix™, Linux™, FreeBSD™, or the like.

The present disclosure provides a method and apparatus for sending downlink information, a method and apparatus for receiving downlink information, a device, and a storage medium.

According to a first aspect of the embodiments of the present disclosure, there is provided a method for sending downlink information, performed by a network device, including:

determining a transport block size scaling (TBS Scaling) processing mode corresponding to first downlink information, the TBS Scaling processing mode including a first processing mode or a second processing mode, the first processing mode being a processing mode to perform TBS Scaling, and the second processing mode being a processing mode not to perform TBS Scaling, and sending the first downlink information in the TBS Scaling processing mode.

In some embodiments, the method includes sending a system message, the system message including a system parameter, determining a transport block size scaling (TBS Scaling) processing mode corresponding to first downlink information includes:

in response to the system parameter being less than or equal to a first set value, determining that the TBS Scaling processing mode corresponding to the first downlink information is the first processing mode;

in response to the system parameter being greater than the first set value, determining that the TBS Scaling processing mode corresponding to the first downlink information is the second processing mode;

or, in response to the system parameter being greater than a second set value, determining that the TBS Scaling processing mode corresponding to the first downlink information is the first processing mode;

in response to the system parameter being less than or equal to the second set value, determining that the TBS Scaling processing mode corresponding to the first downlink information is the second processing mode.

In some embodiments, the method includes:

sending a broadcast channel, the broadcast channel including first indication information, the first indication information including at least one mapping relationship, and the mapping relationship including a user equipment type and a corresponding TBS Scaling processing mode;

determining a transport block size scaling (TBS Scaling) processing mode corresponding to first downlink information includes:

determining the transport block size scaling (TBS Scaling) processing mode corresponding to the first downlink information according to the first indication information.

In some embodiments, the method includes:

sending a broadcast channel, the broadcast channel including second indication information, and the second indication information indicating whether a user equipment with a device type of Redcap uses the first processing mode;

determining a transport block size scaling (TBS Scaling) processing mode corresponding to first downlink information includes:

determining the transport block size scaling (TBS Scaling) processing mode corresponding to the first downlink information according to the second indication information.

In some embodiments, the method includes:

sending second downlink information;

determining a transport block size scaling (TBS Scaling) processing mode corresponding to first downlink information includes:

determining the transport block size scaling (TBS Scaling) processing mode corresponding to the first downlink information according to at least one of following information corresponding to the second downlink information:

whether to use TBS Scaling, and a scaling factor when using TBS Scaling.

In some embodiments, determining the transport block size scaling (TBS Scaling) processing mode corresponding to the first downlink information according to the scaling factor when using TBS Scaling corresponding to the second downlink information includes:

when the scaling factor when using TBS Scaling corresponding to the second downlink information is less than or equal to a set factor, determining that the transport block size scaling (TBS Scaling) processing mode corresponding to the first downlink information is the first processing mode;

when the scaling factor when using TBS Scaling corresponding to the second downlink information is greater than the set factor, determining that the transmission block size scaling (TBS Scaling) processing mode corresponding to the first downlink information is the second processing mode.

In some embodiments, the method includes:

receiving first uplink information;

determining a transport block size scaling (TBS Scaling) processing mode corresponding to first downlink information includes:

determining the transport block size scaling (TBS Scaling) processing mode corresponding to the first downlink information according to a transmission scheme corresponding to the first uplink information.

According to a second aspect of the embodiments of the present disclosure, there is provided a method for receiving downlink information, performed by a user equipment, and including:

determining a transport block size scaling (TBS Scaling) processing mode corresponding to first downlink information, the TBS Scaling processing mode including a first processing mode or a second processing mode, the first processing mode being a processing mode to perform TBS Scaling, and the second processing mode being a processing mode not to perform TBS Scaling;

receiving the first downlink information in the TBS Scaling processing mode.

In some embodiments, determining a transport block size scaling (TBS Scaling) processing mode corresponding to first downlink information includes:

determining the transport block size scaling (TBS Scaling) processing mode corresponding to the first downlink information according to a device type of the user equipment.

In some embodiments, the method includes:

receiving a system message, the system message including a system parameter;

determining a transport block size scaling (TBS Scaling) processing mode corresponding to first downlink information includes:

in response to the system parameter being less than or equal to a first set value, determining that the TBS Scaling processing mode corresponding to the first downlink information is the first processing mode;

in response to the system parameter being greater than the first set value, determining that the TBS Scaling processing mode corresponding to the first downlink information is the second processing mode;

or, in response to the system parameter being greater than a second set value, determining that the TBS Scaling processing mode corresponding to the first downlink information is the first processing mode;

in response to the system parameter being less than or equal to the second set value, determining that the TBS Scaling processing mode corresponding to the first downlink information is the second processing mode.

In some embodiments, the method includes:

receiving a broadcast channel, the broadcast channel including first indication information, the first indication information including at least one mapping relationship, and the mapping relationship including a user equipment type and a corresponding TBS Scaling processing mode;

determining a transport block size scaling (TBS Scaling) processing mode corresponding to first downlink information includes:

determining the transport block size scaling (TBS Scaling) processing mode corresponding to the first downlink information according to the device type of the user equipment and the first indication information.

In some embodiments, the method includes:

receiving a broadcast channel, the broadcast channel including second indication information, the second indication information indicating whether a user equipment with a device type of Redcap uses the first processing mode;

determining a transport block size scaling (TBS Scaling) processing mode corresponding to first downlink information includes:

determining the transport block size scaling (TBS Scaling) processing mode corresponding to the first downlink information according to the device type of the user equipment and the second indication information.

In some embodiments, determining a transport block size scaling (TBS Scaling) processing mode corresponding to first downlink information includes:

in response to not receiving third indication information from a network device, determining that the transport block size scaling (TBS Scaling) processing mode corresponding to the first downlink information is the first processing mode or the second processing mode, wherein the third indication information is used to indicate information for determining the transport block size scaling (TBS Scaling) processing mode corresponding to the first downlink information.

In some embodiments, the method includes:

receiving second downlink information;

determining a transport block size scaling (TBS Scaling) processing mode corresponding to first downlink information includes:

determining the transport block size scaling (TBS Scaling) processing mode corresponding to the first downlink information according to at least one of following information corresponding to the second downlink information:

whether to use TBS Scaling, and a scaling factor when using TBS Scaling.

In some embodiments, determining the transport block size scaling (TBS Scaling) processing mode corresponding to the first downlink information according to the scaling factor when using TBS Scaling corresponding to the second downlink information includes:

when the scaling factor when using TBS Scaling corresponding to the second downlink information is less than or equal to a set factor, determining that the transport block size scaling (TBS Scaling) processing mode corresponding to the first downlink information is the first processing mode;

when the scaling factor when using TBS Scaling corresponding to the second downlink information is greater than the set factor, determining that the transmission block size scaling (TBS Scaling) processing mode corresponding to the first downlink information is the second processing mode.

In some embodiments, the method includes:

sending first uplink information;

determining a transport block size scaling (TBS Scaling) processing mode corresponding to first downlink information includes:

determining the transport block size scaling (TBS Scaling) processing mode corresponding to the first downlink information according to a transmission scheme corresponding to the first uplink information.

In some embodiments, the method includes:

measuring a channel state of a downlink channel;

determining a transport block size scaling (TBS Scaling) processing mode corresponding to first downlink information includes:

determining the transport block size scaling (TBS Scaling) processing mode corresponding to the first downlink information according to the channel state.

In some embodiments, determining the transport block size scaling (TBS Scaling) processing mode corresponding to the first downlink information according to the channel state includes:

determining a time-frequency resource of a corresponding physical random access channel (PRACH) according to the channel state, and determining the TBS Scaling processing mode according to the time-frequency resource and a corresponding relationship, the corresponding relationship including a corresponding relationship between the time-frequency resource and the TBS Scaling processing mode.

According to a third aspect of the embodiments of the present disclosure, there is provided an apparatus for sending downlink information, applied to a network device, including:

a processing module, configured to determine a transport block size scaling (TBS Scaling) processing mode corresponding to first downlink information, the TBS Scaling processing mode including a first processing mode or a second processing mode, the first processing mode being a processing mode to perform TBS Scaling, and the second processing mode being a processing mode not to perform TBS Scaling;

a communication module, configured to send the first downlink information in the TBS Scaling processing mode.

According to a fourth aspect of the embodiments of the present disclosure, there is provided an apparatus for receiving downlink information, applied to a user equipment, including:

a processing module, configured to determine a transport block size scaling (TBS Scaling) processing mode corresponding to first downlink information, the TBS Scaling processing mode including a first processing mode or a second processing mode, the first processing mode being a processing mode to perform TBS Scaling, and the second processing mode being a processing mode not to perform TBS Scaling;

a communication module, configured to receive the first downlink information in the TBS Scaling processing mode.

According to a fifth aspect of the embodiments of the present disclosure, there is provided a network side device, including:

a processor;

a memory, configured to store an executable instruction by the processor;

where the processor is configured to execute the executable instruction in the memory to implement steps of the above method for sending downlink information.

According to a sixth aspect of the embodiments of the present disclosure, there is provided a mobile terminal, including a processor and a memory that is configured to store an executable instruction by the processor. The processor is configured to execute the executable instruction in the memory to implement steps of the above method for receiving downlink information.

According to a seventh aspect of the embodiments of the present disclosure, there is provided a non-transitory computer-readable storage medium storing with an executable instruction, when the executable instruction is executed by a processor, the steps of the above method for sending downlink information or the above method for receiving downlink information are implemented.

The technical solution provided in the embodiments of the present disclosure may include the following beneficial effects: a network device determines a transport block size scaling (TBS Scaling) processing mode corresponding to first downlink information, the TBS Scaling processing mode including a first processing mode or a second processing mode, the first processing mode being a processing mode to perform TBS Scaling, and the second processing mode being a processing mode not to perform TBS Scaling; and, the network device sends the first downlink information in the TBS Scaling processing mode. By using the method, the network device determines a TBS Scaling processing mode corresponding to the first downlink information, and then sends the first downlink information using the processing mode, so that the user equipment can receive the first downlink information using a corresponding processing mode, thus realizing TBS Scaling processing when the first downlink information is sent.

The technical solution provided in the embodiments of the present disclosure may include the following beneficial effects: a user equipment determines a transport block size scaling (TBS Scaling) processing mode corresponding to first downlink information, the TBS Scaling processing mode including a first processing mode or a second processing mode, the first processing mode being a processing mode to perform TBS Scaling, and the second processing mode being a processing mode not to perform TBS Scaling; and, the user equipment receives the first downlink information in the TBS Scaling processing mode. By using the method, the user equipment can determine a TBS Scaling processing mode corresponding to the first downlink information, and receive the first downlink information using a corresponding processing mode, thus realizing TBS Scaling processing when the first downlink information is received.

Other embodiments of the embodiments of the present disclosure will be apparent to those skilled in the art from consideration of the description and practice of the present disclosure. The present disclosure is intended to cover any variations, uses, or adaptations of the embodiments of the present disclosure following the general principles of the embodiments of the present disclosure and including common general knowledge or conventional technical means in the art not disclosed in the present disclosure. The description and embodiments are considered as examples only, with the true scope and spirit of the embodiments of the present disclosure being indicated by the following claims.

It should be understood that the embodiments of the present disclosure are not limited to the precise structures that have been described above and shown in the accompanying drawings, and various modifications and changes may be made without departing from the scope of the embodiments of the present disclosure. The scope of the embodiments of the present disclosure is limited by the appended claims.

INDUSTRIAL APPLICABILITY

The network device determines a transport block size scaling (TBS Scaling) processing mode corresponding to first downlink information, and sends the first downlink information in the TBS Scaling processing mode. After determining a transport block size scaling (TBS Scaling) processing mode corresponding to the first downlink information, the user equipment receives the first downlink information in the TBS Scaling processing mode. By using the method, the network device determines a TBS Scaling processing mode corresponding to the first downlink information, and then sends the first downlink information by using the processing mode, thus realizing TBS Scaling processing when the network device sends the first downlink information, so that the user equipment can receive the first downlink information in a corresponding processing mode.

What is claimed is:

1. A method for sending downlink information, comprising:

determining, by a network device, a transport block size scaling (TBS Scaling) processing mode corresponding to first downlink information, the TBS Scaling processing mode comprising a first processing mode or a second processing mode, the first processing mode being a processing mode to perform TBS Scaling, and the second processing mode being a processing mode not to perform TBS Scaling; and sending, by the network device, the first downlink information in the TBS Scaling processing mode, wherein the first downlink information is received by a user equipment in a TBS Scaling processing mode, and the TBS Scaling processing mode is determined by the user equipment by: measuring a channel state of a downlink channel, determining a time-frequency resource of a corresponding physical random access channel (PRACH) according to the channel state, and determining the TBS Scaling processing mode according to the time-frequency resource and a corresponding relationship, the corresponding relationship comprising a corresponding relationship between the time-frequency resource and the TBS Scaling processing mode;

wherein the method comprises one of:

sending a system message comprising a system parameter, wherein the system parameter is a transmission power of the network device, and determining the TBS Scaling processing mode corresponding to the first downlink information comprises one of: in a case of the system parameter being less than or equal to a first set value, determining that the TBS Scaling processing mode corresponding to the first downlink information is the first processing mode: in a case of the system parameter being greater than the first set value, determining that the TBS Scaling processing mode corresponding to the first downlink information is the second processing mode; in a case of the system parameter being greater than a second set value, determining that the TBS Scaling processing mode corresponding to the first downlink information is the first processing mode; or, in a case of the system parameter being less than or equal to the second set value, determining that the TBS Scaling processing mode corresponding to the first downlink information is the second processing mode;

sending second downlink information, wherein determining the TBS Scaling processing mode corresponding to the first downlink information comprises one of: in a case of a scaling factor when using TBS Scaling corresponding to the second downlink information being less than or equal to a set factor, determining that the TBS Scaling processing mode corresponding to the first downlink information is the first processing mode; or, in a case of a scaling factor when using TBS Scaling corresponding to the second downlink information being greater than the set factor, determining that the TBS Scaling processing mode corresponding to the first downlink information is the second processing mode; or receiving first uplink information, wherein determining the TBS Scaling processing mode corresponding to first downlink information comprises: determining the TBS Scaling processing mode corresponding to the first downlink information according to a transmission scheme corresponding to the first uplink information.

2. The method according to claim 1, wherein receiving the first uplink information comprises one of:

receiving the first uplink information before sending the first downlink information;

receiving the first uplink information after sending the first downlink information; or receiving the first uplink information at a same time as sending the first downlink information.

3. A method for receiving downlink information, comprising:

determining, by a user equipment, a transport block size scaling (TBS Scaling) processing mode corresponding to first downlink information, the TBS Scaling processing mode comprising a first processing mode or a second processing mode, the first processing mode being a processing mode to perform TBS Scaling, and the second processing mode being a processing mode not to perform TBS Scaling; and receiving, by the user equipment, the first downlink information in the TBS Scaling processing mode;

wherein determining the TBS Scaling processing mode corresponding to first downlink information comprises one of:

measuring a channel state of a downlink channel, determining a time-frequency resource of a corresponding physical random access channel (PRACH) according to the channel state, and determining the TBS Scaling processing mode according to the time-frequency resource and a corresponding relationship, wherein the corresponding relationship comprising a corresponding relationship between the time-frequency resource and the TBS Scaling processing mode;

in a case of a system parameter in a system message received by the user equipment being less than or equal to a first set value, determining that the TBS Scaling processing mode corresponding to the first downlink information is the first processing mode, wherein the system parameter is a transmission power of a network device;

in a case of a system parameter in a system message received by the user equipment being greater than the first set value, determining that the TBS Scaling processing mode corresponding to the first downlink information is the second processing mode, wherein the system parameter is a transmission power of a network device;

in a case of a system parameter in a system message received by the user equipment being greater than a second set value, determining that the TBS Scaling processing mode corresponding to the first downlink information is the first processing mode, wherein the system parameter is a transmission power of a network device;

in a case of a system parameter in a system message received by the user equipment being less than or equal to the second set value, determining that the TBS Scaling processing mode corresponding to the first downlink information is the second processing mode, wherein the system parameter is a transmission power of a network device;

in a case of not receiving third indication information from a network device, determining that the TBS Scaling processing mode corresponding to the first downlink information is the first processing mode or the second processing mode, wherein the third indication information is used to indicate information for determining the TBS Scaling processing mode corresponding to the first downlink information;

in a case of a scaling factor when using TBS Scaling corresponding to second downlink information received by the user equipment being less than or equal to a set factor, determining that the TBS Scaling processing mode corresponding to the first downlink information is the first processing mode;

in a case of a scaling factor when using TBS Scaling corresponding to second downlink information received by the user equipment being greater than the set factor, determining that the TBS Scaling processing mode corresponding to the first downlink information is the second processing mode; or determining the TBS Scaling processing mode corresponding to the first downlink information according to a transmission scheme corresponding to first uplink information sent by the user equipment.

4. The method according to claim 3, wherein in a case of not receiving the third indication information from a network device, determining that the TBS Scaling processing mode corresponding to the first downlink information is the first processing mode or the second processing mode comprises:

determining the TBS Scaling processing mode corresponding to the first downlink information according to a mode provided in a communication protocol.

5. A mobile terminal, comprising:

a processor; and a memory, configured to store an executable instruction by the processor;

wherein the processor is configured to execute the executable instruction in the memory to implement steps of the method for receiving downlink information according to claim 3.

6. A network-side device, comprising:

a processor; and a memory, configured to store an executable instruction by the processor;

wherein the processor is configured to execute the executable instruction in the memory to cause the network-side device to:

determine a transport block size scaling (TBS Scaling) processing mode corresponding to first downlink information, the TBS Scaling processing mode comprising a first processing mode or a second processing mode, the first processing mode being a processing mode to perform TBS Scaling, and the second processing mode being a processing mode not to perform TBS Scaling; and send the first downlink information in the TBS Scaling processing mode, wherein the first downlink information is received by a user equipment in a TBS Scaling processing mode, and the TBS Scaling processing mode is determined by the user equipment by: measuring a channel state of a downlink channel, determining a time-frequency resource of a corresponding physical random access channel (PRACH) according to the channel state, and determining the TBS Scaling processing mode according to the time-frequency resource and a corresponding relationship, wherein the corresponding relationship comprising a corresponding relationship between the time-frequency resource and the TBS Scaling processing mode;

wherein the network-side device is further cause to perform one of:

sending a system message comprising a system parameter, wherein the system parameter is a transmission power of the network device, and determining the TBS Scaling processing mode corresponding to the first downlink information comprises one of: in a case of the system parameter being less than or equal to a first set value, determining that the TBS Scaling processing mode corresponding to the first downlink information is the first processing mode; in a case of the system parameter being greater than the first set value, determining that the TBS Scaling processing mode corresponding to the first downlink information is the second processing mode: in a case of the system parameter being greater than a second set value, determining that the TBS Scaling processing mode corresponding to the first downlink information is the first processing mode; or, in a case of the system parameter being less than or equal to the second set value, determining that the TBS Scaling processing mode corresponding to the first downlink information is the second processing mode;

sending second downlink information, wherein determining the TBS Scaling processing mode corresponding to the first downlink information comprises one of: in a case of a scaling factor when using TBS Scaling corresponding to the second downlink information being less than or equal to a set factor, determining that the TBS Scaling processing mode corresponding to the first downlink information is the first processing mode; or, in a case of a scaling factor when using TBS Scaling corresponding to the second downlink information being greater than the set factor, determining that the TBS Scaling processing mode corresponding to the first downlink information is the second processing mode; or receiving first uplink information, wherein determining a TBS Scaling processing mode corresponding to first downlink information comprises: determining the TBS Scaling processing mode corresponding to the first downlink information according to a transmission scheme corresponding to the first uplink information.

* * * * *